(12) United States Patent
Sharifi Mehr

(10) Patent No.: US 12,003,540 B1
(45) Date of Patent: Jun. 4, 2024

(54) COMMUNICATION SESSION RESUMPTION

(71) Applicant: Amazon Technologies, Inc., Seattle, WA (US)

(72) Inventor: Nima Sharifi Mehr, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 283 days.

(21) Appl. No.: 17/196,875

(22) Filed: Mar. 9, 2021

Related U.S. Application Data

(63) Continuation of application No. 15/003,651, filed on Jan. 21, 2016, now Pat. No. 10,951,652.

(51) Int. Cl.
*H04L 9/40* (2022.01)

(52) U.S. Cl.
CPC ........ *H04L 63/166* (2013.01); *H04L 63/0428* (2013.01); *H04L 63/0807* (2013.01)

(58) Field of Classification Search
CPC .............. H04L 63/166; H04L 63/0428; H04L 63/0807
See application file for complete search history.

(56) References Cited

U.S. PATENT DOCUMENTS

| | | | |
|---|---|---|---|
| 6,041,357 A | 3/2000 | Kunzelman et al. | |
| 7,219,223 B1 | 5/2007 | Bacchus et al. | |
| 7,634,230 B2 | 12/2009 | Ji et al. | |
| 7,917,758 B2 | 3/2011 | Palekar et al. | |
| 8,387,130 B2 | 2/2013 | Love et al. | |
| 8,856,658 B2 | 10/2014 | Brosh et al. | |
| 8,997,193 B2 | 3/2015 | Videlov et al. | |
| 9,591,084 B1 * | 3/2017 | Egorov | H04L 63/0807 |
| 9,807,121 B1 * | 10/2017 | Levy | H04L 63/0464 |
| 9,930,067 B1 * | 3/2018 | Johansson | H04L 63/0478 |
| 2003/0188193 A1 | 10/2003 | Venkataramappa | |
| 2003/0226017 A1 | 12/2003 | Palekar et al. | |
| 2004/0210756 A1 | 10/2004 | Mowers et al. | |
| 2007/0180500 A1 * | 8/2007 | Tanada | H04L 63/08 726/4 |
| 2009/0110200 A1 | 4/2009 | Srinivas | |

(Continued)

OTHER PUBLICATIONS

Dierks, T., and E. Rescorla, "The Transport Layer Security (TLS) Protocol Version 1.2," Request for Comments: 5246, Standards Track, Aug. 2008, 98 pages.

(Continued)

*Primary Examiner* — Beemnet W Dada
(74) *Attorney, Agent, or Firm* — Davis Wright Tremaine LLP

(57) ABSTRACT

The present document describes a communication session resumption mechanism. A client computer system establishes a communication session to a server computer that is a member of a set of related server computers. As a result of establishing the communication session, the server computer identifies the set of related server computers to the client computer system. The set of related server computers share communication session information with each other, allowing the client computer system to resume the communication session with another server computer belonging to the set of related server computers. The communication session may be specified to the other server computer by the client computer system by providing a session identifier or a session ticket.

21 Claims, 16 Drawing Sheets

(56) References Cited

U.S. PATENT DOCUMENTS

| | | |
|---|---|---|
| 2012/0110572 A1 | 5/2012 | Kodi et al. |
| 2012/0151249 A1 | 6/2012 | Swan et al. |
| 2012/0174196 A1 | 7/2012 | Bhogavilli et al. |
| 2012/0271769 A1 | 10/2012 | Franco et al. |
| 2013/0205360 A1 | 8/2013 | Novak et al. |
| 2013/0305334 A1 | 11/2013 | Videlov et al. |
| 2014/0195797 A1* | 7/2014 | du Toit ................ H04L 63/168 713/152 |
| 2014/0282978 A1 | 9/2014 | Lerner et al. |
| 2014/0289826 A1 | 9/2014 | Croome |
| 2014/0331297 A1 | 11/2014 | Innes et al. |
| 2015/0006789 A1 | 1/2015 | Buer |
| 2017/0126643 A1 | 5/2017 | Wood |
| 2017/0164416 A1 | 6/2017 | Yeddala |

OTHER PUBLICATIONS

Salowey, J., et al., "AES Galois Counter Mode (GCM) Cipher Suites for TLS," Request for Comments: 5288, Standards Track, Aug. 2008, 9 pages.

Rescorla, E., "TLS Elliptic Curve Cipher Suites with SHA- 256/384 and AES Galois Counter Mode (GCM)," Request for Comments: 5289, Informational, Aug. 2008, 7 pages.

Igoe, K., and J. Solinas, "AES Galois Counter Mode for the Secure Shell Transport Layer Protocol," Request for Comments: 5647, Informational, Aug. 2009, 10 pages.

Stebiula, D., and J. Green, "Elliptic Curve Algorithm Integration in the Secure Shell Transport Layer," Request for Comments: 5656, Standards Track, Dec. 2009, 19 pages.

Rescorla, E., et al., "Transport Layer Security (TLS) Renegotiation Indication Extension," Request for Comments: 5746, Standards Track, Feb. 2010, 16 pages.

McGrew, D., and E. Rescorla, "Datagram Transport Layer Security (DTLS) Extension to Establish Keys for the Secure Real-time Transport Protocol (SRTP)," Request for Comments: 5764, Standards Track, May 2010, 27 pages.

Brown, M., and R. Housley, "Transport Layer Security (TLS) Authorization Extensions," Request for Comments: 5878, Experimental, May 2010, 19 pages.

Kato, A., et al., "Camellia Cipher Suites for TLS," Request for Comments: 5932, Standards Track, Jun. 2010, 7 pages.

Eastlake, E., "Transport Layer Security (TLS) Extensions: Extension Definitions," Request for Comments: 6066, Standards Track, Jan. 2011, 25 pages.

Tuexen, M., et al., "Datagram Transport Layer Security (DTLS) for Stream Control Transmission Protocol (SCTP)," Request for Comments: 6083, Standards Track, Jan. 2011, 10 pages.

Mavrogiannopoulos, N., and D. Gillmor, "Using OpenPGP Keys for Transport Layer Security (TLS) Authentication," Request for Comments: 6091, Informational, Feb. 2011, 9 pages.

Turner, S., and T. Polk, "Prohibiting Secure Sockets Layer (SSL) Version 2.0," Request for Comments: 6176, Standards Track, Mar. 2011, 4 pages.

Igoe, K., and D. Stebila, "X.509v3 Certificates for Secure Shell Authentication," Request for Comments: 6187, Standards Track, Mar. 2011, 17 pages.

Kim, W., et al., "Addition of the ARIA Cipher Suites to Transport Layer Security (TLS)," Request for Comments: 6209, Informational, Apr. 2011, 10 pages.

Igoe, K., "Suite B Cryptographic Suites for Secure Shell (SSH)," Request for Comments: 6239, Informational, May 2011, 15 pages.

Rescorla, E., and N. Modadugu, "Datagram Transport Layer Security Version 1.2," Request for Comments: 6347, Standards Track, Jan. 2012, 33 pages.

Kanno, S., and M. Kanda, "Addition of the Camellia Cipher Suites to Transport Layer Security (TLS)," Request for Comments: 6367, Informational, Sep. 2011, 9 pages.

Salter, M., and R. Housley, "Suite B Profile for Transport Layer Security (TLS)," Request for Comments: 6460, Informational, Jan. 2012, 15 pages.

Sury, O., "Use of the SHA-256 Algorithm With RSA, Digital Signature Algorithm (DSA), and Elliptic Curve DSA (ECDSA) in SSHFP Resource Records," Request for Comments: 6594, Standards Track, Apr. 2012, 9 pages.

McGrew, D., and D. Bailey, "AES-CCM Cipher Suites for Transport Layer Security (TLS)," Request for Comments: 6655, Standards Track, Jul. 2012, 8 pages.

Bider, D., and M. Baushke, "SHA-2 Data Integrity Verification for the Secure Shell (SSH) Transport Layer Protocol," Request for Comments: 6668, Standards Track, Jul. 2012, 6 pages.

Merkle, J., and M. Lochter, "Elliptic Curve Cryptography (ECC) Brainpool Curves for Transport Layer Security (TLS)," Request for Comments: 7027, Informational, Oct. 2013, 11 pages.

Gutmann, P., "Encrypt-then-MAC for Transport Layer Security (TLS) and Datagram Transport Layer Security (DTLS)," Request for Comments: 7366, Standards Track, Sep. 2014, 7 pages.

Hoffman-Andrews, J., "Forward Secrecy at Twitter," Twitter, Nov. 22, 2013, <https://blog.twitter.com/2013/forward-secrecy-at-twitter-0> [retrieved Jan. 15, 2016], 6 pages.

Lin, Z., "TLS Session Resumption: Full-Speed and Secure," Feb. 24, 2015, <https://blog.cloudflare.com/tls-session-resumption-full-speed-and-sec- ure/> [retrieved Jan. 15, 2016], 6 pages.

Atkinson, R., "Security Architecture for the Internet Protocol," Request for Comments: 1825, Standards Track, Aug. 1995, 23 pages.

Atkinson, R., "IP Authentication Header," Request for Comments: 1826, Standards Track, Aug. 1995, 14 pages.

Atkinson, R., "IP Encapsulating Security Payload (ESP), " Request for Comments: 1827, Standards Track, Aug. 1995, 13 pages.

Metzger, P., et al., "IP Authentication Using Keyed MD5," Request for Comments: 1828, Standards Track, Aug. 1995, 6 pages.

Karn, P., et al., "The ESP DES-CBC Transform," Request for Comments: 1829, Standards Track, Aug. 1995, 11 pages.

Dierks, T., et al., "The TLS Protocol Version 1.0," Request for Comments: 2246, Standards Track, Jan. 1999, 75 pages.

Kent, S., "Security Architecture for the Internet Protocol," Request for Comments: 2401, Standards Track, Nov. 1998, 62 pages.

Orman, H., "The OAKLEY Key Determination Protocol," Request for Comments: 2412, Informational, Nov. 1998, 56 pages.

Newman, C., "Using TLS with IMAP, POP3 and ACAP," Request for Comments: 2595, Standards Track, Jun. 1999, 16 pages.

Medvinsky, A., et al., "Addition of Kerberos Cipher Suites to Transport Layer Security (TLS)," Request for Comments: 2712, Standards Track, Oct. 1999, 7 pages.

Khare, R., et al., "Upgrading to TLS Within HTTP/1.1," Request for Comments: 2817, Standards Track, May 2000, 13 pages.

Rescorla, E., "HTTP Over TLS," Request for Comments: 2818, Informational, May 2000, 8 pages.

Hoffman, P., "SMTP Service Extension for Secure SMTP over Transport Layer Security," Request for Comments: 3207, Standards Track, Feb. 2002, 9 pages.

Chown, P., "Advanced Encryption Standard (AES) Ciphersuites for Transport Layer Security (TLS)," Request for Comments: 3268, Standards Track, Jun. 2002, 8 pages.

Blake-Wilson, S., et al., "Transport Layer Security (TLS) Extensions," Request for Comments: 3546, Standards Track, Jun. 2003, 28 pages.

Hollenbeck, S., "Transport Layer Security Protocol Compression Methods," Request for Comments: 3749, Standards Track, May 2004, 8 pages.

Friend, R., "Transport Layer Security (TLS) Protocol Compression Using Lempel-Ziv-Stac (LZS)," Request for Comments: 3943, Informational, Nov. 2004, 13 pages.

Moriai, S., et al., "Addition of Camellia Cipher Suites to Transport Layer Security (TLS)," Request for Comments: 4132, Standards Track, Jul. 2005, 8 pages.

Lee, H.J., et al., "Addition of SEED Cipher Suites to Transport Layer Security (TLS)," Request for Comments: 4162, Standards Track, Aug. 2005, 7 pages.

(56) References Cited

OTHER PUBLICATIONS

Ford-Hutchinson, P., "Securing FTP with TLS," Request for Comments: 4217, Standards Track, Oct. 2005, 29 pages.
Lehtinen, S., and C. Lonvick, "The Secure Shell (SSH) Protocol Assigned Numbers," Request for Comments: 4250, Standards Track, Jan. 2006, 19 pages.
Ylonen, T., and C. Lonvick, "The Secure Shell (SSH) Protocol Architecture," Request for Comments: 4251, Standards Track, Jan. 2006, 28 pages.
Ylonen, T., and C. Lonvick, "The Secure Shell (SSH) Authentication Protocol," Request for Comments: 4252, Standards Track, Jan. 2006, 16 pages.
Ylonen, T., and C. Lonvick, "The Secure Shell (SSH) Transport Layer Protocol," Request for Comments: 4253, Standards Track, Jan. 2006, 30 pages.
Ylonen, T., and C. Lonvick, "The Secure Shell (SSH) Connection Protocol," Request for Comments: 4254, Standards Track, Jan. 2006, 23 pages.
Schlyter, J., and W. Griffin, "Using DNS to Securely Publish Secure Shell (SSH) Key Fingerprints," Request for Comments: 4255, Standards Track, Jan. 2006, 9 pages.
Cusack, F., and M. Forssen, "Generic Message Exchange Authentication for the Secure Shell Protocol (SSH)," Request for Comments: 4256, Standards Track, Jan. 2006, 12 pages.
Eronen, P., and H. Tschofenig, "Pre-Shared Key Ciphersuites for Transport Layer Security (TLS)," Request for Comments: 4279, Standards Track, Dec. 2005, 16 pages.
Kent, S., and K. Seo, "Security Architecture for the Internet Protocol," Request for Comments: 4301, Standards Track, Dec. 2005, 102 pages.
Kent, S., "IP Encapsulating Security Payload (ESP)," Request for Comments: 4303, Standards Track, Dec. 2005, 45 pages.
Housley, R., "Using Advanced Encryption Standard (AES) CCM Mode With IPsec Encapsulating Security Payload (ESP)," Request for Comments: 4309, Standards Track, Dec. 2005, 14 pages.
Galbraith, J., and P. Remaker, "The Secure Shell (SSH) Session Channel Break Extension," Request for Comments: 4335, Standards Track, Jan. 2006, 6 pages.
Bellare, M., et al., "The Secure Shell (SSH) Transport Layer Encryption Modes," Request for Comments: 4344, Standards Track, Jan. 2006, 12 pages.
Harris, B., "Improved Arcfour Modes for the Secure Shell (SSH) Transport Layer Protocol," Request for Comments: 4345, Standards Track, Jan. 2006, 5 pages.
Rescorla, E., and N. Modadugu, "Datagram Transport Layer Security," Request for Comments: 4347, Standards Track, Apr. 2006, 26 pages.
Blake-Wilson, S., et al., "Transport Layer Security (TLS) Extensions," Request for Comments: 4366, Standards Track, Apr. 2006, 29 pages.
Friedl, M., et al., "Diffie-Hellman Group Exchange for the Secure Shell (SSH) Transport Layer Protocol," Request for Comments: 4419, Standards Track, Mar. 2006, 10 pages.
Harris, B., "RSA Key Exchange for the Secure Shell (SSH) Transport Layer Protocol," Request for Comments: 4432, Standards Track, Mar. 2006, 8 pages.
Hutzelman, J., et al., "Generic Security Service Application Program Interface (GSS-API) Authentication and Key Exchange for the Secure Shell (SSH) Protocol," Request for Comments: 4462, Standards Track, May 2006, 28 pages.
Blake-Wilson, S., et al., "Elliptic Curve Cryptography (ECC) Cipher Suites for Transport Layer Security (TLS)," Request for Comments: 4492, Informational, May 2006, 36 pages.
Salowey, J., et al., "Transport Layer Security (TLS) Session Resumption Without Server-Side State," Request for Comments: 4507, Standards Track, May 2006, 17 pages.
Santesson, S., "TLS Handshake Message for Supplemental Data," Request for Comments: 4680, Standards Track, Sep. 2006, 10 pages.
Santesson, S., et al., "TLS User Mapping Extension," Request for Comments: 4681, Standards Track, Oct. 2006, 11 pages.
Galbraith, J. and R. Thayer, "The Secure Shell (SSH) Public Key File Format," Request for Comments: 4716, Nov. 2006, 11 pages.
Blumenthal, U., and P. Goel, "Pre-Shared Key (PSK) Ciphersuites with NULL Encryption for Transport Layer Security (TLS)," Request for Comments: 4785, Standards Track, Jan. 2007, 6 pages.
Galbraith, J., et al., "Secure Shell Public Key Subsystem," Request for Comments: 4819, Standards Track, Mar. 2007, 18 pages.
Taylor, D., et al., "Using the Secure Remote Password (SRP) Protocol for TLS Authentication," Request for Comments: 5054, Informational, Nov. 2007, 25 pages.
Salowey, J., et al., "Transport Layer Security (TLS) Session Resumption without Server-Side State," Request for Comments: 5077, Standards Track, Jan. 2008, 21 pages.
Mavrogiannopoulos, N., "Using OpenPGP Keys for Transport Layer Security (TLS) Authentication," Request for Comments: 5081, Experimental, Nov. 2007, 9 pages.
Phelan, T., "Datagram Transport Layer Security (DTLS) over the Datagram Congestion Control Protocol (DCCP)," Request for Comments: 5238, Standards Track, May 2008, 11 pages.

\* cited by examiner

COMMUNICATION SESSION RESUMPTION

CROSS REFERENCE TO RELATED APPLICATION

This application is a continuation of U.S. patent application Ser. No. 15/003,651, filed Jan. 21, 2016, entitled "COMMUNICATION SESSION RESUMPTION," the disclosure of which is hereby incorporated herein in its entirety.

BACKGROUND

Establishing cryptographically protected network communication sessions is a complex problem that can impose significant computational costs on network entities that participate in such communications. For example, when establishing a new communication session using transport layer security ("TLS"), parties to the communication session negotiate a set of session keys for use in encrypting data exchanged between the parties. This negotiation may require several back and forth transmissions between the parties where seed values, supported protocol lists, and shared secrets are encrypted, exchanged, and decrypted. As a result, significant network and computational overhead may be incurred in the course of establishing the new communication session.

Some secure protocols provide a way for previously established connections to be re-established, called session resumption. In TLS for example, re-establishing a previous TLS session may be accomplished using session identifiers and session tickets to retrieve parameters associated with a previous communication session. As a result, session resumption generally requires fewer network exchanges and imposes less computational overhead on the parties than establishing a new session. For example, by reusing previously-negotiated cryptographic parameters, certain steps for negotiating connection parameters can be avoided. Network entities that support session-resumption capabilities generally retain session information such as cryptographic parameters in association with the destination IP address or domain name. If a network entity wishes to establish a new communication session with a particular destination for which previous session information is available, the network entity can request resumption of the previous session, and reuse the retained connection parameters when establishing the new secure connection.

If the network entity connects to a destination for which previous session information is not available, then the secure session is negotiated from scratch, potentially resulting in a performance penalty. Avoiding this performance penalty, while maintaining the integrity of the secure protocol, is a difficult problem.

BRIEF DESCRIPTION OF THE DRAWINGS

Various techniques will be described with reference to the drawings, in which.

DETAILED DESCRIPTION

Figure 1:
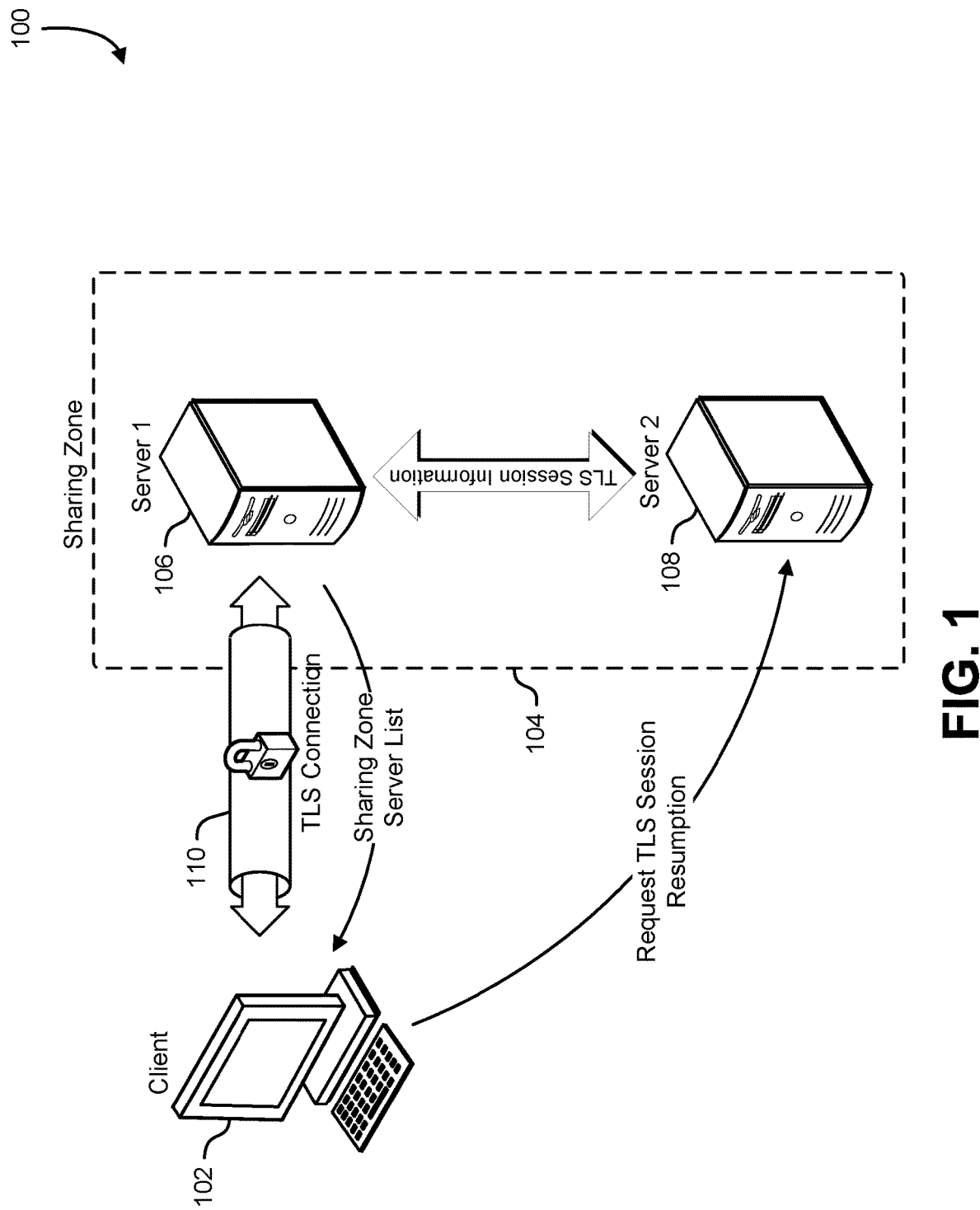
FIG. 1 shows an illustrative example of an environment in which various embodiments may be practiced.

The current document describes allowing a client computer system to establish a communication session, such as a TLS session or other cryptographically protected communication session, with a particular server in a set of related servers, and then resuming the communication session with a different server in the set of related servers. Resuming the communication session allows the client computer system and the other server to reuse previously negotiated cryptographic material or session parameters. By enabling session resumption across the set of related servers, communication sessions are established more quickly and with less computational overhead. Session resumption is supported by providing the client computer system with a session identifier ("ID") or session ticket as a result of establishing a communication session, and by sharing corresponding session resumption information across the set of related servers. The client computer system can use the provided session ID or session ticket to resume a communication session with a different server in the set of related servers.

In some implementations, a session ticket is used to store session parameters for later session resumption. The client computer system establishes a communication session with a server, and the server provides the client computer system with a server list and a session ticket. The server list identifies a set of related servers for which the session ticket may be used to resume the communication session. The session ticket includes cryptographic material such as session keys and shared secrets that are associated with the communication session. The session ticket is encrypted with a cryptographic key by the server, and the cryptographic key is shared with other servers within the set of related servers. The client computer system retains the cryptographic information and session parameters associated with the communication session, and the session ticket provided by the server, together with the list of related servers with which the information may be used.

If the client computer system determines to resume a communication session with a different server in the set of related servers, the client computer system searches local storage and retrieves the session ticket and the previously used session parameters for the different server. The session ticket is provided to the different server, and the different server uses the cryptographic key to decrypt the cryptographic information and session parameters contained within the ticket. The client computer system and the different server establish a communication session that reuses the stored session parameters, and in many instances, are able to avoid renegotiation of session keys and shared secret information.

In another implementation, a session ID is used to identify sessions that may be resumed. As a result of establishing a communication session between a client and a server, the server provides the client with a list of related servers, and a session ID is negotiated by the client computer system and the server. Both the client computer system and the server retain session parameters associated with the communication session. The client computer system retains the session parameters, together with the session ID, on a storage device accessible to the client computer system. The server retains the session parameters, together with the session ID, on a shared data store that is accessible by the servers with which the session parameters may be used.

The client computer system may provide the session ID to a different server within the list of related servers to resume a communication session with the different server, and the resumed communication session will reuse the session parameters associated with the session ID. If the client computer system determines to resume a communication session with a different server in the set of related servers, the client computer system searches local storage and retrieves the appropriate session parameters and the session ID for the different server. The session ID is provided by the client to the different server, and the different server retrieves the session parameters from the shared data store using the session ID. The client computer system and the different server resume the session, using the previous session parameters associated with the session ID. Renegotiation of session parameters may be unnecessary, saving the associated computing time and resources.

In the current document, the establishment and resumption of communication sessions is discussed within the framework of the transport layer security ("TLS") protocol, and may also be applicable to connection-oriented protocols, cryptographically-protected communication protocols, and systems that negotiate shared-secret material. A communication session may be a cryptographically protected communication session such as a TLS session, and a particular communication session may be used to establish a plurality of logical connections between a client and a server.

FIG. 1 shows an illustrative example of an environment in which various embodiments may be practiced. A system 100 includes a client computer system 102 and a sharing zone 104 containing a number of server computer systems that share information relating to previously established TLS connections. The sharing zone 104 includes a first server 106 and a second server 108. Servers within the sharing zone 104 may or may not have trust relationships with each other. For example, servers in the sharing zone 104 may be associated with a common digital certificate, or may be associated with different digital certificates. The client computer system 102 communicates with the first server 106 via a TLS connection 110. During the establishment of the TLS connection 110, the first server 106 provides a list of the servers within the sharing zone 104. The list of servers may be specified in a number of ways. In some examples, the list of servers includes one or more IP address ranges. In another example, the list of servers includes a regular expression that matches fully qualified domain names of servers in the sharing zone. In yet another example, the list of servers includes a reference to information that identifies the servers in the sharing zone. The list of servers may be provided during the TLS handshake. In one example, the client computer system 102 sends a "client hello" message to the first server 106 containing an extension record. The extension record indicates, to the first server 106, that the client computer system 102 supports session resumption with multiple servers within the sharing zone 104. In response, the first server 106 returns a "server hello" message containing an extension record that identifies the servers within the sharing zone 104. The client computer system 102 retains a list of the servers within the sharing zone together with session information associated with the TLS connection 110. The session information may include cryptographic material, session keys, session identifiers ("ID's"), premaster secrets, and master secrets associated with the TLS connection 110.

In another implementation, the list of servers is provided to the client computer system 102 by the first server 106 within a digital certificate provided by the first server 106. As part of the TLS handshake between the first server 106 and the client computer system 102, the client computer system 102 requests the digital certificate of the first server 106. The first server 106 responds by providing a digital certificate associated with the first server 106. The digital certificate may include a list of servers with which the first server 106 shares TLS session information. For example, the list of servers may be included in an X.509 certificate extension in the first server's digital certificate.

In yet another implementation, the client may identify servers with which retained session information may be used by comparing a public key within a prospective server's digital certificate to a public key of a previous server with which a previous TLS connection was established. If the public key of the prospective server matches the public key of the previous server, the client computer system 102 determines that the previous server shares TLS connection information with the prospective server and attempt to resume a TLS session with the potential server using information retained from the previous TLS connection.

The first server 106 shares TLS session information with other servers within the sharing zone 104. In some examples, the TLS session information is stored in a shared database accessible by the servers within the sharing zone 104, and indexed using a session ID. The session ID may be assigned by the client computer system 102, assigned by the first server 106, or negotiated by the client computer system 102 in coordination with the first server 106. In another example, the TLS session information is encapsulated in the form of a TLS session ticket and transmitted to the client computer system 102 via the TLS connection 110. Cryptographic keys for decrypting the TLS session ticket are shared amongst the servers within the sharing zone 104.

If the client computer system 102 initiates communication with the second server 108, the client computer system 102 searches the stored TLS session information for TLS session information that can be used to resume a previous TLS session with the second server 108. If usable TLS session information is not found, the client computer system 102 negotiates a new TLS session with the second server 108. If usable TLS session information is found, the client computer system 102 attempts to resume the previous TLS session by sending, in an extension record of a TLS hello message, a session ID or session ticket corresponding to the usable TLS session information. If for some reason, the second server 108 is unable to resume the previous TLS session, the second server 108 can cause a new TLS session to be negotiated. If the provided session ID or session ticket is usable by the second server 108, the second server uses the session information associated with the previous TLS session and resumes the TLS session with the client computer system 102.

The TLS session information that is shared within the sharing zone 104 may be expired in a variety of ways. In some examples, information for a particular TLS session expires when the particular TLS session is unused for an amount of time. In another example, information for a particular TLS session expires when the particular TLS session is resumed a threshold number of times. In yet another example, information for a particular TLS session expires when a threshold amount of data is transmitted via the TLS session. In yet another example, information for a particular TLS session expires when a threshold amount of data is received by the TLS session. In yet another example, information for a particular TLS session expires when the particular TLS session is resumed with a threshold number of distinct servers within the sharing zone 104. Expiration parameters may be unique to each server within the sharing zone 104. For example, TLS session information generated as a result of TLS connections to the first server 106 may expire after a first threshold amount of time, and TLS session information generated as a result of TLS connections to the second server 108 may expire after a second threshold amount of time.

Figure 2:
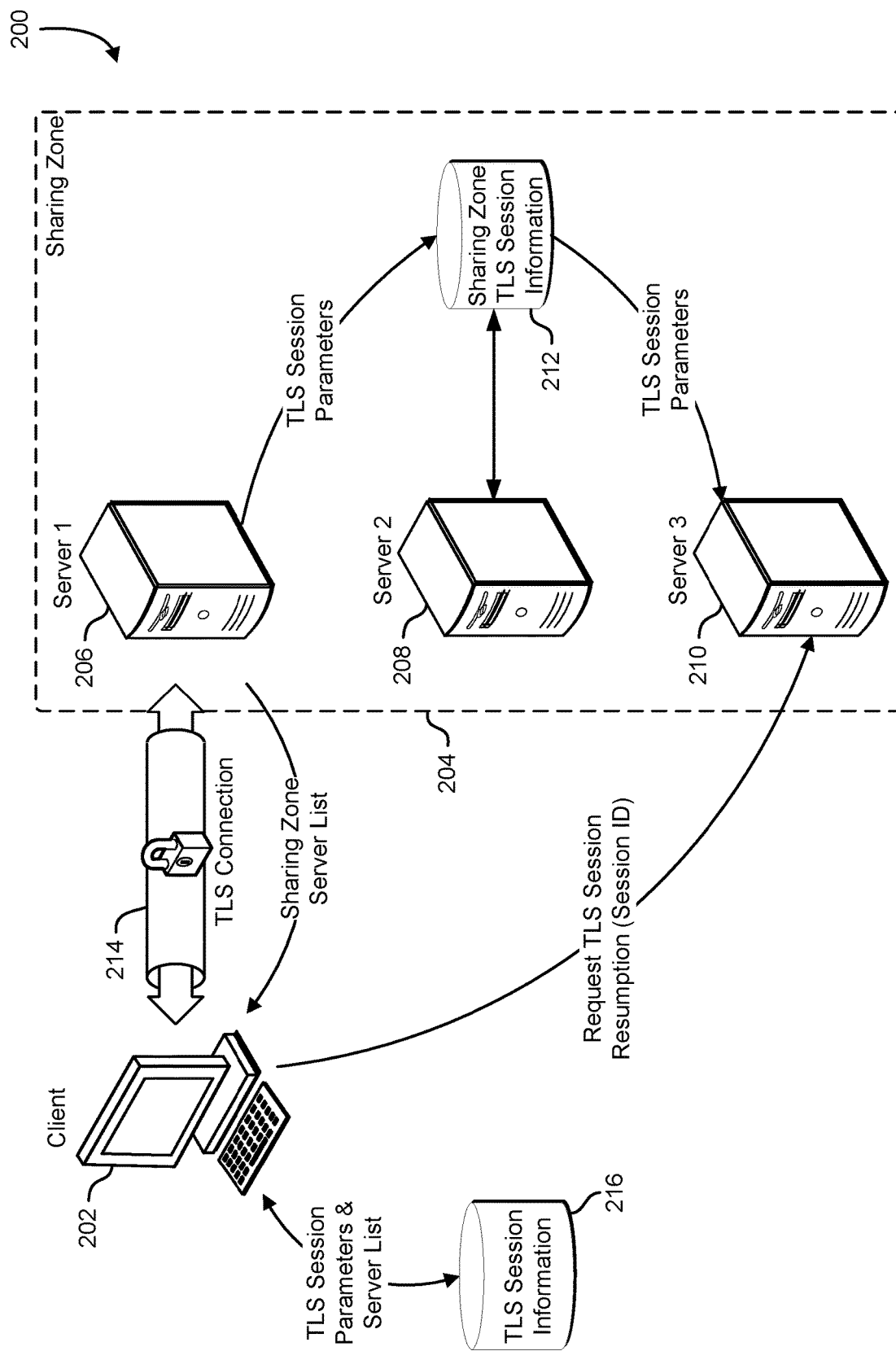
FIG. 2 shows an illustrative example of a system that supports TLS session resumption using session IDs which are shared across a number of servers.

FIG. 2 shows an illustrative example of a system that supports TLS session resumption using session IDs which are shared across a number of servers. A system diagram 200 includes a client computer system 202 and a sharing zone 204 containing a number of server computers. The sharing zone 204 includes a first server 206, a second server 208, and the third server 210. The server computers retain TLS session information in a shared database 212. The shared database 212 includes TLS session information associated with TLS sessions established by the servers. The TLS session information may be used by servers in the sharing zone 204 to resume TLS sessions that were established by other servers in the sharing zone 204.

For example, if the client computer system 202 establishes a TLS connection 214 with the first server 206, the first server 206 stores TLS session parameters associated with the TLS connection 214 in the shared database 212. The client computer system 202 stores corresponding TLS session parameters in a client database 216. The client computer system 202 and the first server 206 identify the TLS session parameters with a session ID. The session ID may be established in a number of ways. In some examples, the client computer system 202 generates a pseudo-unique identifier, such as a global unique ID ("GUID"), for use as a session ID, and the client computer system 202 provides the generated session ID to the first server 206. In another example, the first server 206 generates a session ID based at least in part on a database index generated using the shared database 212, and the first server 206 provides the generated session ID to the client computer system 202.

The TLS session information includes connection parameters such as premaster secrets, master secrets, session keys, session IDs, read encryption keys, write encryption keys, write message authentication code ("MAC") keys, and read MAC keys. The TLS session information may also include information identifying particular servers with which the TLS session information may be used. For example, the TLS session information may include a list of servers within the sharing zone 204 for which the TLS session information may be used to resume a TLS session. The TLS session information may include an expiration time for the TLS session information, or an expiration time for each server for which the TLS session information may be used.

The client computer system 202 may request resumption of a TLS session with another server computer in the sharing zone 204, such as the third server 210, by providing an appropriate session ID with the request to establish the TLS session. The client computer system 202 queries the client database 216 to locate non-expired TLS session information that is applicable to the third server 210. If applicable TLS session information is not found, the client computer system 202 establishes a new TLS session to the third server 210. If applicable TLS session information is found, the client computer system 202 retrieves the session ID from the client database 216, and sends a request to the third server 210 that includes the session ID of the applicable TLS session information. The third server 210 receives the session ID and queries the shared database 212. If the third server 210 cannot find TLS session information for the provided session ID, the third server 210 establishes a new TLS session with the client computer system 202. If the third server 210 finds TLS session information associated with the provided session ID, the third server 210 creates a TLS session with the client computer system 202 using the TLS session information retrieved from the shared database 212. The client computer system 202 uses information from the client database 216 to establish the resumed TLS session.

Sharing zones may be established across groups of servers that are related so that the chances of a client computer system being able to resume a previous TLS session are increased. For example, a sharing zone may be established around a group of e-commerce servers, ad servers, and Web servers, that work together to provide an online shopping service. A client computer system that establishes a TLS session with one server associated with the online shopping service can reuse TLS session information with other servers associated with the online shopping service. The resulting online experience may be more responsive and use less computing resources, without significantly compromising the security of the online shopping service.

Figure 3:
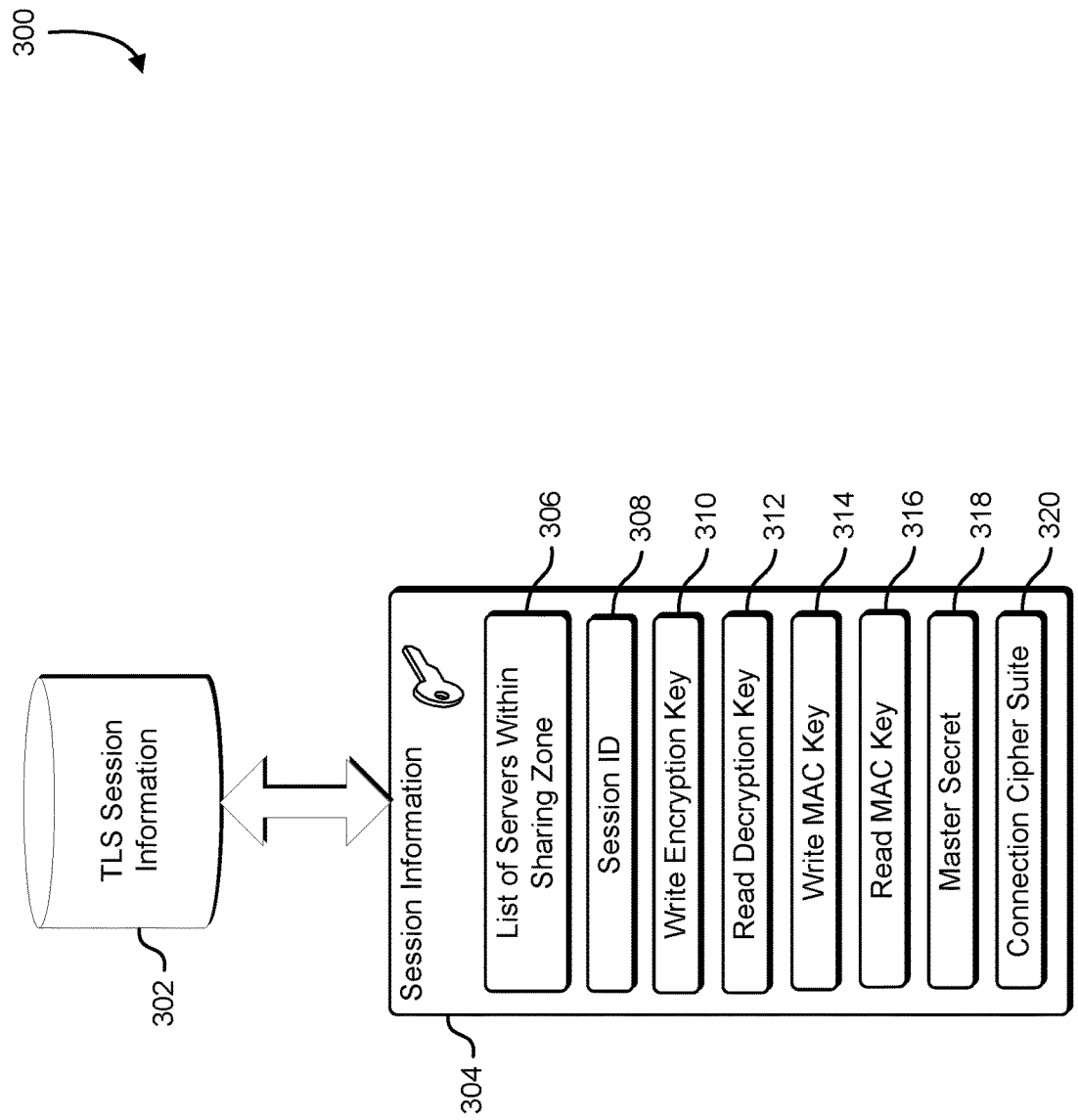
FIG. 3 shows an illustrative example of retained session information that supports TLS session resumption using session IDs.

FIG. 3 shows an illustrative example of retained session information that supports TLS session resumption using session IDs. A data diagram 300 shows a database 302 that holds TLS session information. A session information record 304 includes a list of servers 306 with which the session information record 304 may be used, and a session ID 308 that identifies the session information. Cryptographic parameters associated with a TLS connection include a write encryption key 310, a read decryption key 312, a write MAC key 314, and a read MAC key 316. A master secret 318 may also be included in the session information record 304 to facilitate the generation of other cryptographic parameters. The session information record 304 includes information that specifies a connection cipher suite 320 used with the TLS connection. The session information record 304 may include additional information that identifies a compression algorithm, and encryption algorithm, and a MAC algorithm for the TLS session.

TLS session information retained within a sharing zone may be indexed by session ID so that session information for incoming session resumption requests, which contain session IDs, can be quickly and efficiently accessed. TLS session information retained by a client computer system may be indexed using the list of servers for which the session information record is valid.

Figure 4:
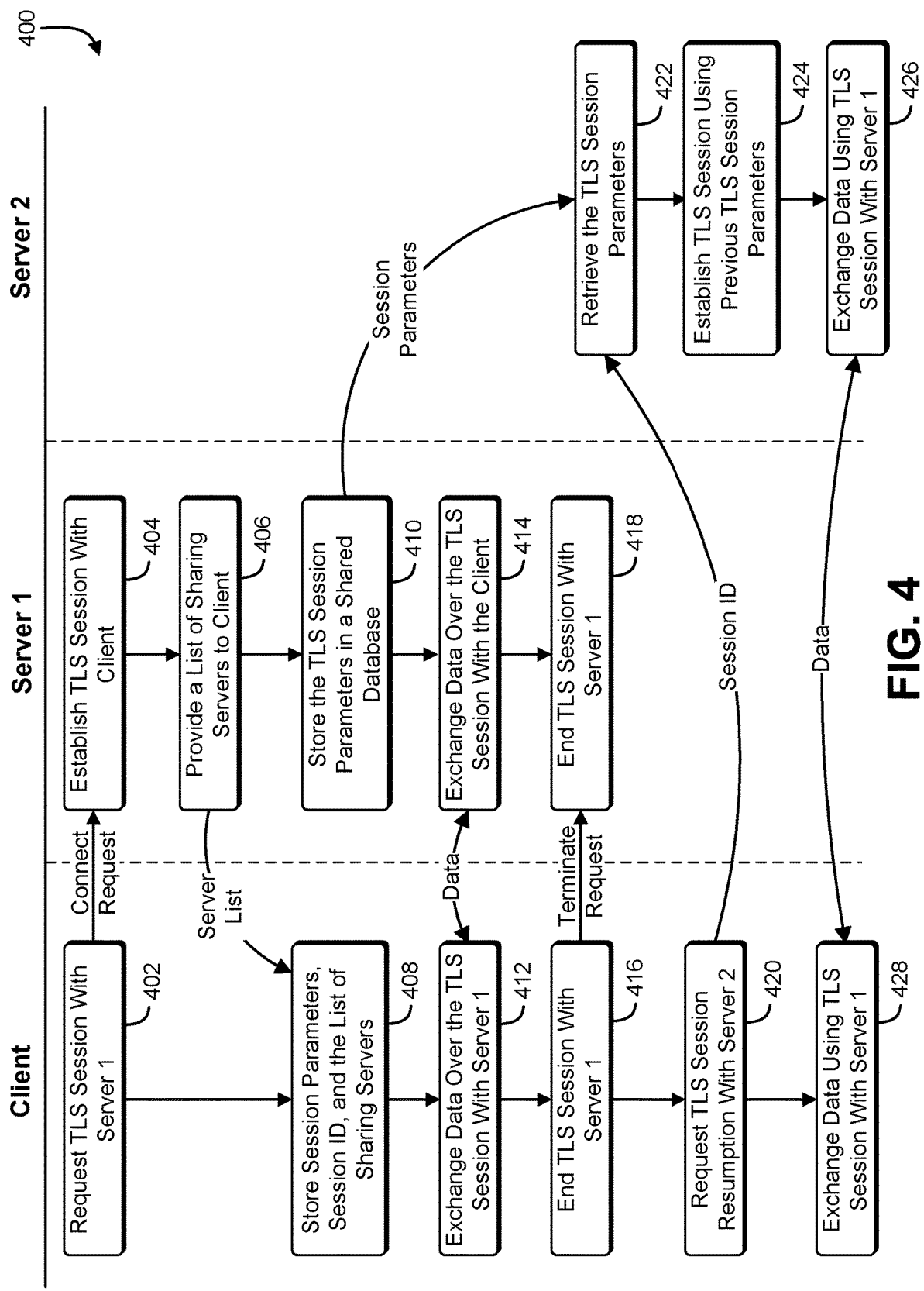
FIG. 4 shows an illustrative example of a process that, as a result of being performed by a client computer system, a first server, and a second server, establishes a TLS session with the first server, and reestablishes the TLS session with a second server by providing a shared session ID.

FIG. 4 shows an illustrative example of a process that, as a result of being performed by a client computer system, a first server, and a second server, establishes an initial TLS session with the first server, and reestablishes the TLS session with a second server by providing a shared session ID. A swim diagram 400 shows a process that begins at block 402 with the client computer system requesting the establishment of the initial TLS session with the first server. The client computer system sends a TLS "client hello" message to the first server, which is received by the first server at block 404. The TLS "client hello" message includes an extension record that indicates to this first server that the client computer system supports TLS session resumption with multiple servers. In response to the TLS "client hello" message, the first server sends a TLS "server hello" message to the client computer system. The TLS "server hello" message provides 406, to the client computer system, a list of servers for which the session parameters associated with the initial TLS session may be reused. The client computer system and the first server complete the TLS handshake and establish the initial TLS session.

At block 408, the client computer system stores TLS session information associated with the initial TLS session in a client database. The TLS session information includes information sufficient to resume the initial TLS session with another server. The TLS session information may include session parameters, a session ID, the list of servers with which the information may be used, cryptographic keys, and expiration information. At block 410, the first server stores TLS session information in a shared database. The TLS session information includes information sufficient to resume the initial TLS session with the client computer system. The TLS session information can include session parameters, a list of servers with which the TLS session information may be used, expiration information, cryptographic information, session keys, master secrets, and session IDs.

At block 412 and 414, the client computer system and the first server exchange data over a TLS connection associated with the initial TLS session. The data is exchanged using the TLS record protocol, and is encrypted in accordance with the ciphers and cryptographic keys negotiated by the client computer system and the first server during the TLS handshake. After the data exchange is complete, the client computer system terminates 416 the TLS connection with the first server. In response, the first server terminates 418 the TLS connection with the client computer system.

At block 420, the client computer system initiates a TLS session with the second server. The client computer system searches the client database to determine if the client database contains non-expired TLS session information that can be used to resume a TLS session with the second server. If applicable TLS session information is not found, the client computer system establishes a new TLS session with a second server. If applicable TLS session information is found in the client database, the client computer system sends a TLS "client hello" message to the second server that includes a session ID associated with the applicable TLS session information. At block 422, the second server receives the TLS "client hello" message, and queries the shared database for TLS session information associated with the session ID provided by the client computer system. If the second server does not find corresponding TLS session information, the second server initiates a full TLS session negotiation with the client computer system. If the second server does find corresponding TLS session information, the TLS session parameters are retrieved for use in resuming the initial TLS session. At block 424, the second server resumes the initial TLS session with the client computer system using the retrieved TLS session parameters. The client computer system resumes the initial TLS session using the TLS session parameters saved in the client database.

At blocks 426 and 428, the client computer system and the second server exchange data via a TLS connection associated with the resumed TLS session. In general, the TLS session parameters associated with the resumed TLS session match the TLS session parameters associated with the initial TLS session.

Figure 5:
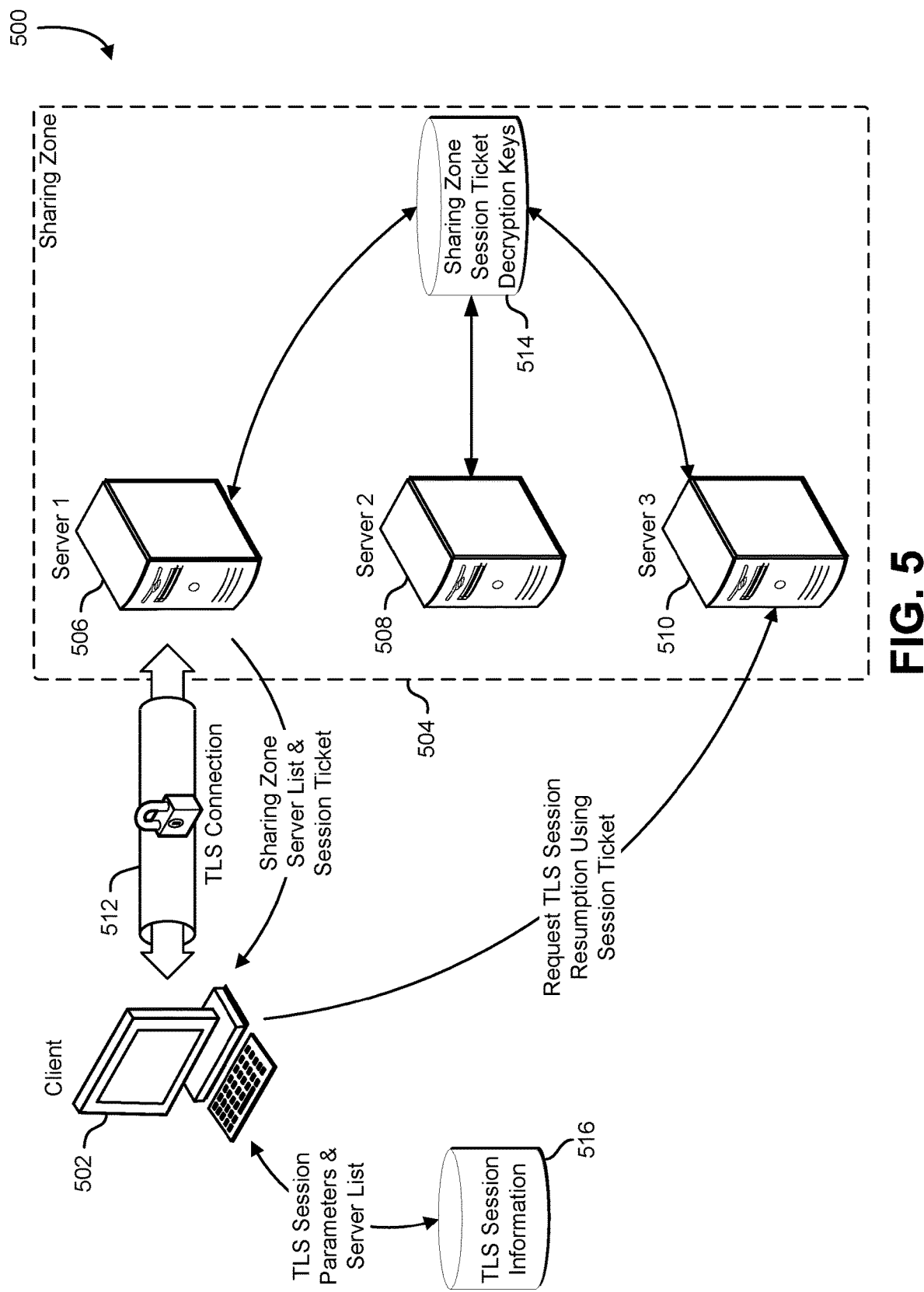
FIG. 5 shows an illustrative example of a system that supports TLS session resumption using session tickets that are supported by more than one server.

FIG. 5 shows an illustrative example of a system that supports TLS session resumption using session tickets that are supported by more than one server. A system diagram 500 includes a client computer system 502 that communicates with a number of servers within a sharing zone 504. The sharing zone 504 contains servers that are able to share TLS session information that enables TLS session resumption. The sharing zone 504 includes a first server 506, a second server 508, and a third server 510. The client computer system 502 establishes a TLS session with the first server 506, and the client computer system 502 communicates with the first server 506 over a TLS connection 512 associated with the TLS session.

As a result of establishing the initial TLS connection, the first server 506 provides the client computer system 502 with a list of servers in the sharing zone 504. The list service identifies those servers for which the information associated with the TLS connection 512 may be used to resume another TLS session. The list of servers may be provided by the first server 506 in a TLS "server hello" message that is sent to the client computer system 502. In addition to the list of servers, the first server 506 generates a session ticket and transmits the session ticket to the client computer system 502. The session ticket includes TLS session information that is encrypted by the first server 506 with a cryptographic key. In general, the cryptographic key is not accessible to the client computer system 502. The session ticket may include an initialization vector, a write encryption key, a read encryption key, a write MAC key, a read MAC key, and a message authentication code. The first server 506 stores the cryptographic key used to encrypt the session ticket in a shared database 514. The shared database is accessible to the servers within the sharing zone 504. The client computer system 502 retains a variety of TLS session information in a client database 516. The information retained in the client database 516 can be used by the client computer system 502 to resume TLS sessions with various servers within the sharing zone 504. The client computer system 502 retains TLS session parameters negotiated by the client computer system 502, the list of servers provided by the first server 506, and the session ticket provided by the first server 506, in the client database 516.

The client computer system 502 can establish a TLS connection with another server in the sharing zone 504 using the information maintained in the client database 516. To establish a TLS connection with the third server 510, the client computer system 502 searches the client database 516 for TLS session information that can be reused. Information from the client database 516 is arranged so that TLS session information is associated with a list of servers for which the TLS session information is usable. For example, the information associated with the TLS connection 512 is stored in the client database 516. The server list provided by the first server 506 identifies the third server 510 as being usable with the session information associated with the TLS connection 512. The client computer system 502 retrieves the session ticket provided by the first server 506, and provides the session ticket to the third server 510. The first server 506 stores the cryptographic information necessary to decrypt the session ticket in the shared database 514, and therefore, the third server 510 is able to retrieve a decryption key from the shared database 514, and decrypt the session ticket. The session ticket contains the session keys and the cryptographic information necessary to resume the TLS session associated with the TLS connection 512. The client computer system 502 retrieves the corresponding session parameters, which are retained with the session ticket, from the client database 516. The implementation illustrated in FIG. 5 allows the client computer system 502 to control how long TLS session information is retained. So long as the shared database 514 retains the cryptographic keys necessary to decrypt session tickets, the client computer system 502 may provide corresponding session tickets to resume TLS sessions.

The shared database 514 contains information that allows the servers within the sharing zone 504 to decrypt session tickets. The information contained in the shared database 514 may be a single cryptographic key such as a symmetric cryptographic key or a private cryptographic key of a public-private cryptographic key pair. In some examples, each server in the sharing zone 504 maintains a public-private cryptographic key pair and places the public key of the public-private cryptographic key pair on the shared database 514. Session tickets are encrypted with the private key of the public-private cryptographic key pair. In some implementations, the shared database 514 is implemented as a distributed system across the servers within the sharing zone 504. The servers within the sharing zone 504 synchronize the cryptographic key with each other via a network connection within the sharing zone 504. In another implementation, a server within the sharing zone 504 may request ticket decryption keys from another server within the sharing zone 504. For example, when the third server 510 receives the TLS session resumption ticket from the client computer system 502, the TLS session resumption ticket may include information that identifies the source of the TLS session resumption ticket as the first server 506. The third server 510 may then request a decryption key for the TLS session resumption ticket from the first server 506. If the first server 506 shares with the third server 510, the first server 506 provides the decryption key for the TLS session resumption ticket to the third server 510.

Figure 6:
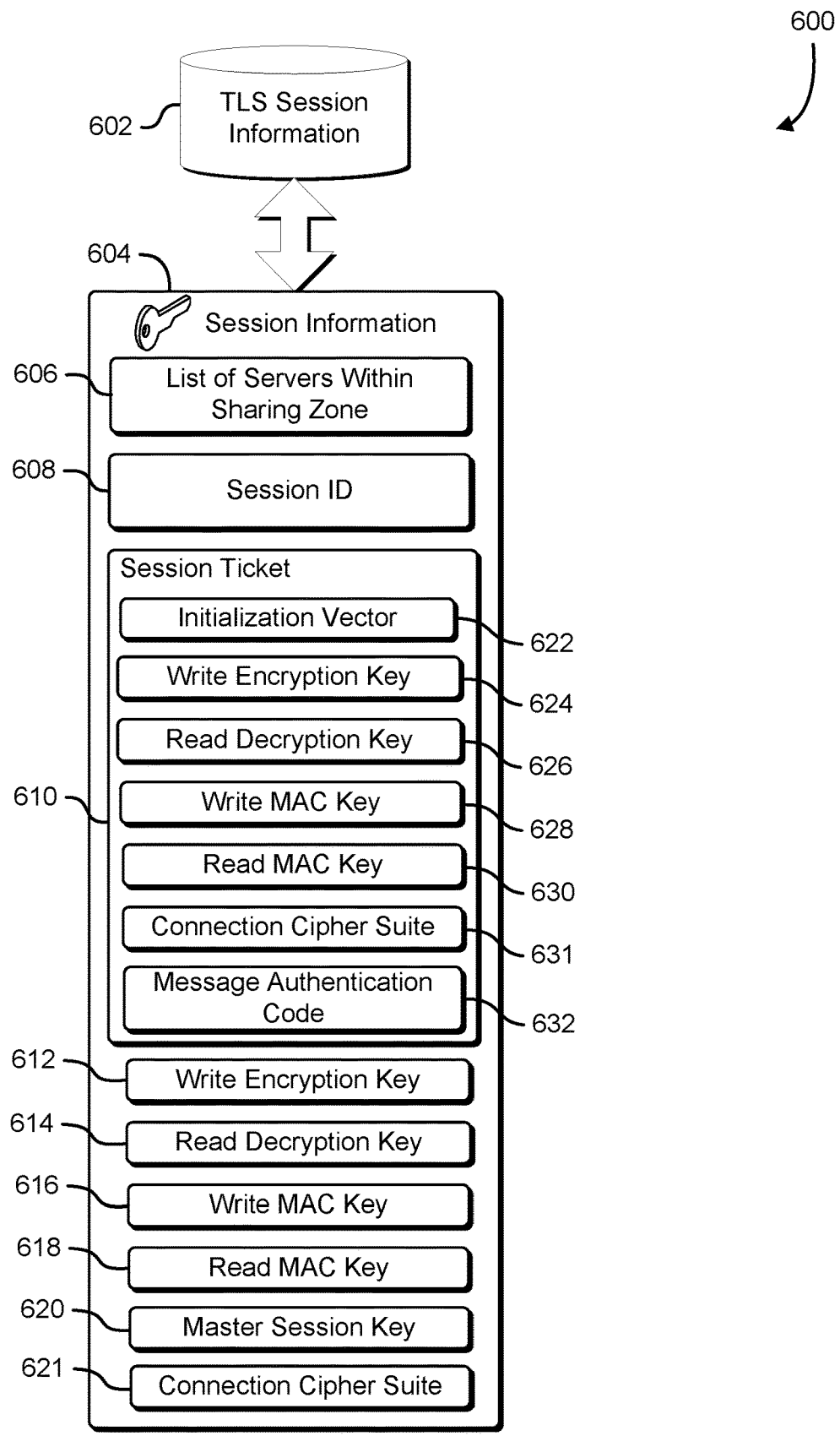
FIG. 6 shows an illustrative example of session information that supports TLS session resumption using session tickets.

FIG. 6 shows an illustrative example of session information that supports TLS session resumption using session tickets. A data diagram 600 shows how information may be arranged within a client database 602 connected to a client computer system. A session information record 604 includes a list of servers 606 for which the information in the session information record may be used. The list of servers 606 may identify some or all of the servers within the sharing zone, or an arbitrary set of servers with which the session information record may be used to resume a TLS session. The session information record 604 includes a session ID 608 that identifies the TLS session and a session ticket 610. The session information record 604 includes client-maintained TLS session parameters including a write encryption key 612, a read decryption key 614, a write MAC key 616, a read MAC key 618, a master session key 620, and a connection cipher suite 621. The client-maintained TLS session parameters may be used by the client computer system when resuming a TLS session associated with the session information record 604.

The session ticket 610 holds session parameters that are encrypted by another computer system, and which may be used by servers identified in the list of servers 606 to resume a TLS session. The information within the session ticket 610 may not be an accessible to the client computer system. The session ticket 610 includes an initialization vector 622, a write encryption key 624, a read decryption key 626, a write MAC key 628, a read MAC key 630, a connection cipher suite 631, and the message authentication code 632. The initialization vector 622 may be a randomly generated value or a pseudo-randomly generated value. The message authentication code 632 helps maintain the integrity of the ticket by protecting against forged or altered tickets.

The message authentication code 632 may be determined using a strong integrity protection algorithm such as HMAC-SHA-256. The remaining ticket elements, 624, 626, 628, 630, and 631, comprise the encrypted body of the session ticket. Additional information regarding the structure of the session ticket 610 is described in RFC 5077, which is included herein by reference.

The session information records are arranged within the client database 602 so that particular session information records can be identified based at least in part on the identity of a particular server. The client database may maintain a hash table or index for the session information records for this purpose. When the client computer determines to initiate a TLS session with a particular server computer, the client computer accesses the client database 602 and searches for the particular server computer in the collection of session information records. If the particular computer is not found within the list of servers contained within any of the session information records, the client computer system establishes a new TLS session with a particular server computer. If the particular computer is found within the list of servers of a particular session information record, the particular session information record is used to resume a TLS session with a particular server computer. In general, the information contained in the particular session information record was generated as part of a TLS session between a client computer system and another server computer, but may nonetheless be used to resume the TLS session between the client computer system and the particular server computer. The session ticket within the particular session information record is provided to the particular server computer, and used by the particular server computer to resume the TLS session. The remaining information in the session information record is used by the client computer system to resume the resumed TLS session.

Additional fields may be added to the session information record 604 to support the management and expiration of session information maintained in the client database 602. For example, an expiration time may be included in the session information record 604 that specifies when the session information record 604 may be deleted. In another example, the usage count may be included in the session information record 604 that identifies the number of sessions which may be resumed using the session information record 604.

Figure 7:
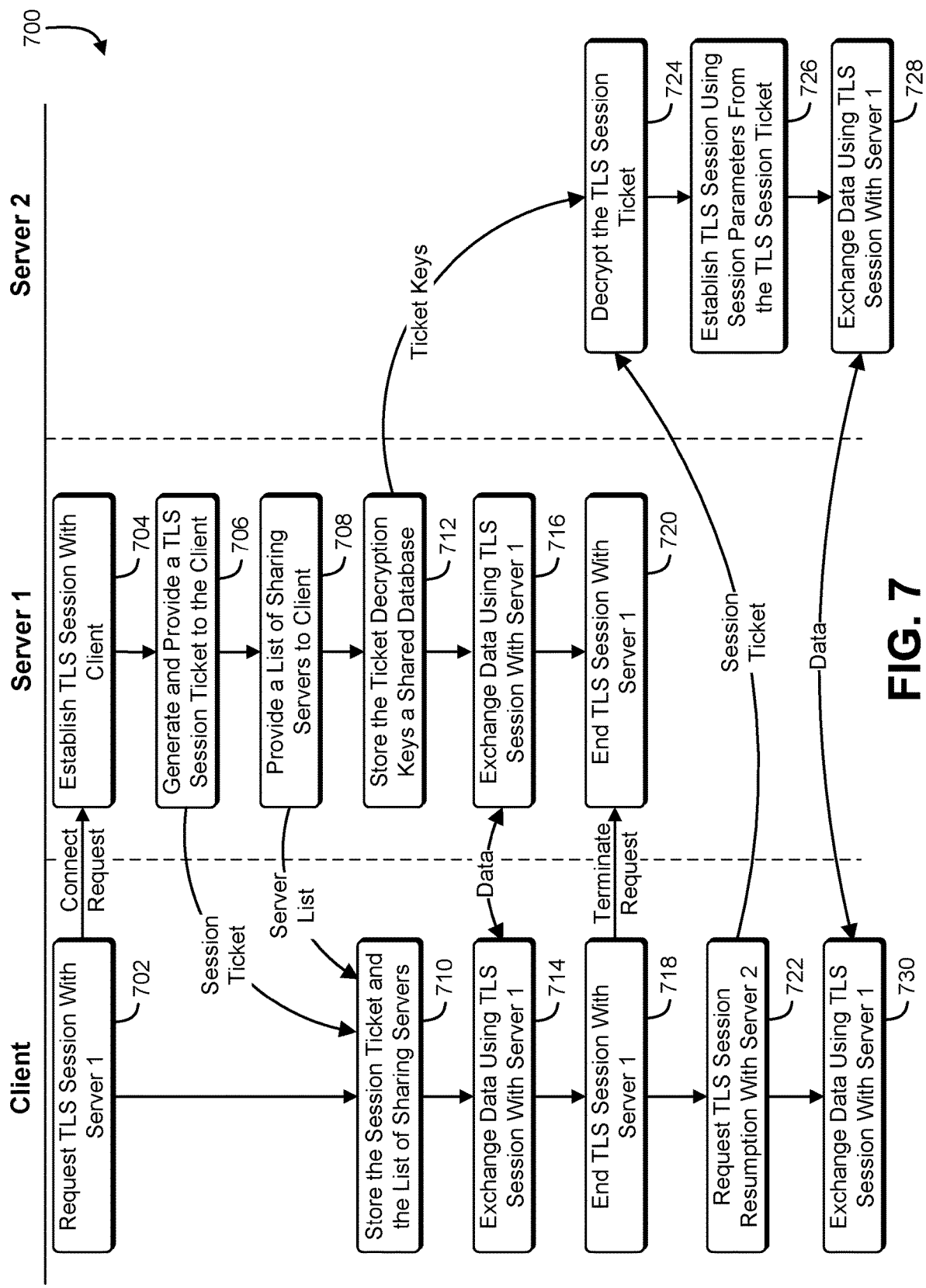
FIG. 7 shows an illustrative example of a process that, as a result of being performed by a client computer system, a first server, and a second server, establishes a TLS session with the first server, and reestablishes the TLS session with a second server by providing a session ticket associated with the TLS session.

FIG. 7 shows an illustrative example of a process that, as a result of being performed by a client computer system, a first server, and a second server, establishes a TLS session with the first server, and reestablishes the TLS session with a second server by providing a session ticket associated with the TLS session. A swim diagram 700 shows a process that begins at block 702 with the client computer system requesting establishment of a TLS session with the first server. In response to the request, the first server establishes 704 the TLS session with the client computer system. As a result of establishing the TLS session, the first server generates 706 a set of TLS session parameters. The set of TLS session parameters are encrypted using a cryptographic key accessible to the first server to generate a session ticket. The session ticket is provided to the client computer system. At block 708, the first server assembles a list of servers. The list of servers identifies the servers with which the session ticket may be used to resume the TLS session. The list of servers is provided to the client computer system.

At block 710, the client computer system receives the session ticket and the list of servers. The session ticket, the list of servers, and the client's TLS session parameters are stored in a client database. At block 712, the first server stores a cryptographic key that is able to decrypt the session ticket into a shared database. For example, the cryptographic key may be the same cryptographic key used to encrypt the session ticket or a corresponding public key if a private cryptographic key was used to encrypt the session ticket. The shared database may be accessible by servers identified in the list of servers, so that the servers identified in the list of servers can decrypt the session key when resuming the TLS session.

The client computer system and the first server exchange information via a TLS connection associated with the TLS session, in accordance with the TLS protocol, until either the client computer system or the first server terminates the connection. At block 714, the client computer system exchanges data with the first server via the TLS connection. At block 716, the first server exchanges data with the client computer system via the TLS connection. At block 718, the client computer system initiates the termination of the TLS connection. At block 720, the first server receives the termination request, and terminates the TLS connection.

After the initial TLS connection is closed, the client computer system may resume the TLS session with another server from the list of servers provided by the first server. At block 722, the client computer system determines to establish a TLS session with a second server. The client computer system searches the client database for non-expired session information that includes a server list that includes the second server. If the client computer system does not find applicable session information for the second server, the client computer system initiates a new TLS session with a second server. If the client computer system finds applicable session information for the second server, the client computer system retrieves the session information from the client database. The session information includes session parameters usable by the client computer system to resume the TLS session, and a session ticket that the client computer system provides to the second server. The second server receives 724 the session ticket and decrypts the session ticket using the cryptographic key stored by the first server and retrieved from the shared database. The session ticket may be validated using a digital signature present on the session ticket. If the session ticket is valid, and the session ticket is not expired, the second server resumes 726 the TLS session with the client computer system using the TLS session parameters extracted from the session ticket.

Once the TLS session is resumed, the client computer system and the second server can exchange data 728 over a resumed TLS session having TLS session parameters that are based at least in part on the TLS connection previously established between the client computer system and the first server. At block 730, the client computer system exchanges data with the second server via the resumed TLS session. At block 732, the second server exchanges data with the client computer system via the resumed TLS session.

Figure 8:
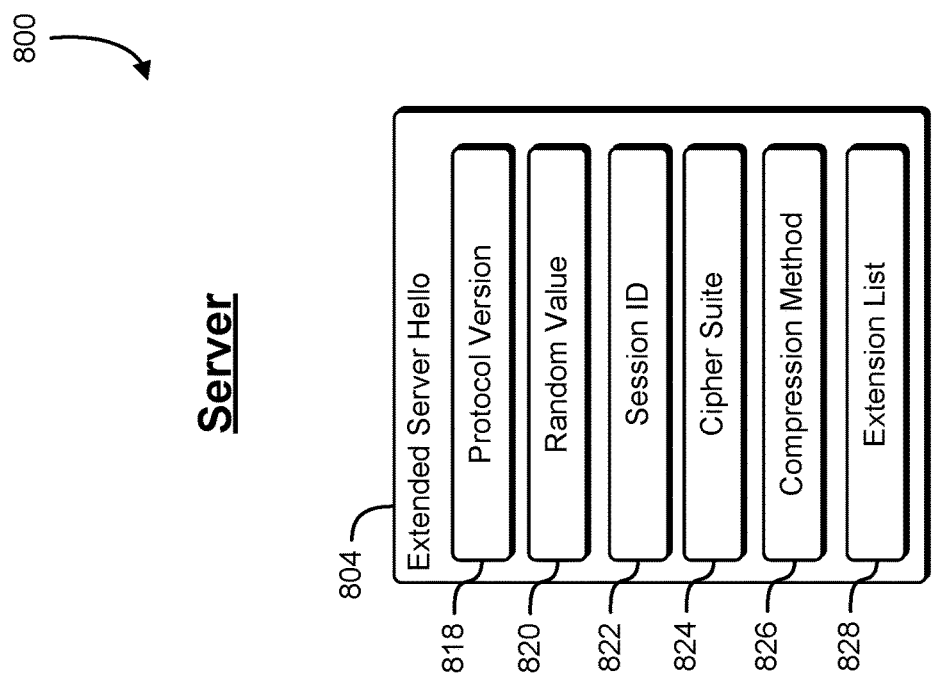
FIG. 8 shows an illustrative example of TLS "client hello" and "server hello" messages with extensions that support TLS session resumption across multiple servers.
Figure 8:
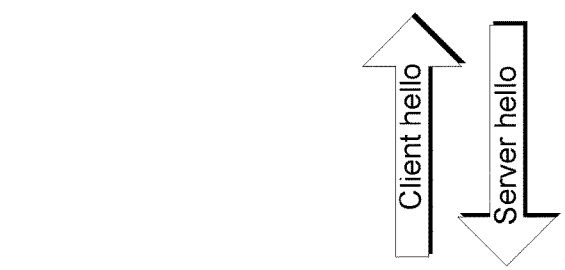
Figure 8:
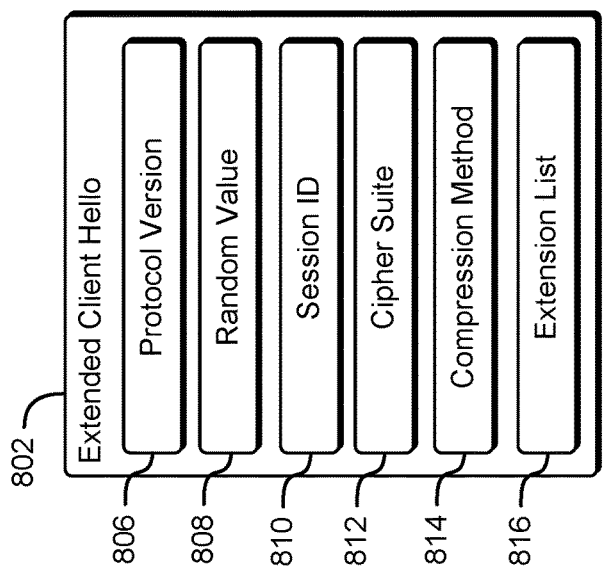

FIG. 8 shows an illustrative example of TLS "client hello" and "server hello" messages with extensions that support TLS session resumption across multiple servers. A data diagram 800 shows the structure of an extended "client hello" message 802 and an extended "server hello" message 804. The extended "client hello" message 802 and the extended "server hello" message 804 are exchanged during a TLS handshake that establishes a TLS session. The extended "client hello" message 802 includes a protocol version 806, a random value 808, a session ID 810, a cipher Suite 812, a compression method 814, and an extension list 816. The protocol version 806 identifies the version of the TLS protocol supported by the client computer system. For example, the protocol version 806 may identify TLS version 1.2 or TLS version 1.3. The random value 808 is generated by the client computer system using a random number generator or pseudorandom number generation techniques. The random value 808 may be used during the establishment of a shared master secret for the TLS session. The session ID is an identifier that identifies the TLS session. The session ID may be generated by the client computer system and transmitted to the server. The cipher suite 812 identifies cipher algorithms that are supported by the client computer system. The compression method 814 identifies compression method supported by the client computer system. The extension list 816 includes one or more extension records that are supported by the client. The server computer system, as a result of receiving one or more extension records, may respond with corresponding extension records in the extended "server hello" message 804. In some implementations, as a result of receiving particular extension records from the client computer system, the server computer system responds with other handshake messages during the TLS handshake.

The extended "server hello" message 804 includes a protocol version 818, a random value 820, a session ID 822, a cipher Suite 824, a compression method 826, and an extension list 828. The protocol version 818 identifies the TLS protocol version implemented by the server computer system. The random value 820 is a random value generated by the server computer system that may be used when generating a shared master secret for the TLS session. The session ID 822 identifies the TLS session. The cipher Suite 824 communicates, to the client computer system, a cipher algorithm to be used for the TLS connection. The compression method 826 identifies a compression algorithm to be used with the TLS connection. The extension list 828 includes one or more extension records that extend the TLS protocol. The extension records may include extension records listed in the extension list 816 of the extended "client hello" message 802. The extended "client hello" message 802 and the extended "server hello" message 804 can support an extension record, within their respective extension lists, for exchanging information related to TLS resumption functions. An example of such an extension record is shown in FIG. 9.

Figure 9:
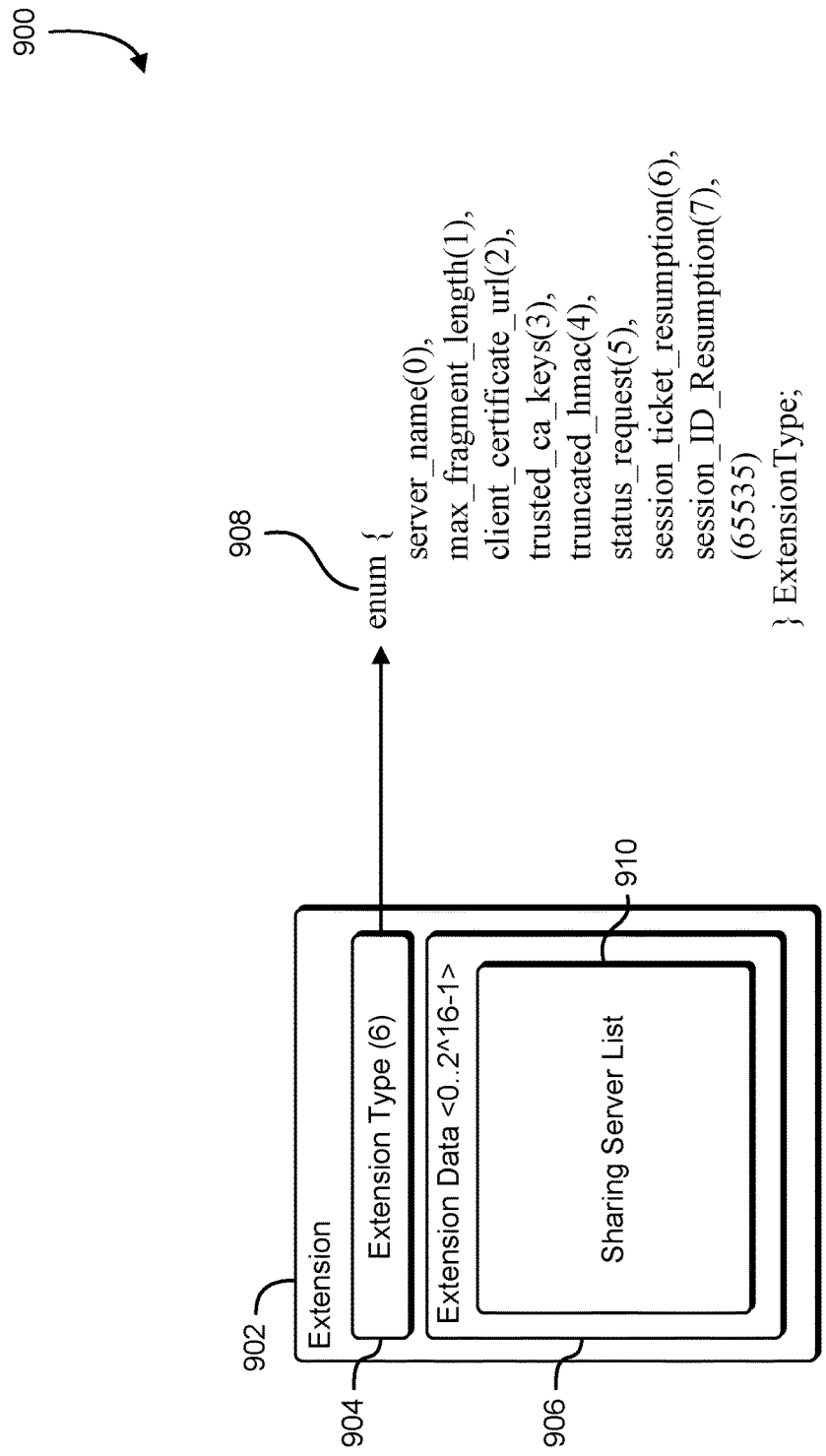
FIG. 9 shows an illustrative example of a TLS extension record that supports TLS session resumption across multiple servers using session tickets.

FIG. 9 shows an illustrative example of a TLS extension record that supports TLS session resumption across multiple servers using session tickets. A data diagram 900 shows a structure of an extension record 902. The extension record 902 includes an extension type 904, and extension data 906. The extension type 904 is defined by an enumeration 908. The extension data 906 includes a sharing server list 910. The sharing server list 910 identifies a collection of servers for which particular TLS session data may be used for session resumption. When used within an extended TLS "server hello" message, the extension record 902 allows a server to provide a client computer system with the list of servers for which the associated TLS session data may be used to perform session resumption.

Figure 10:
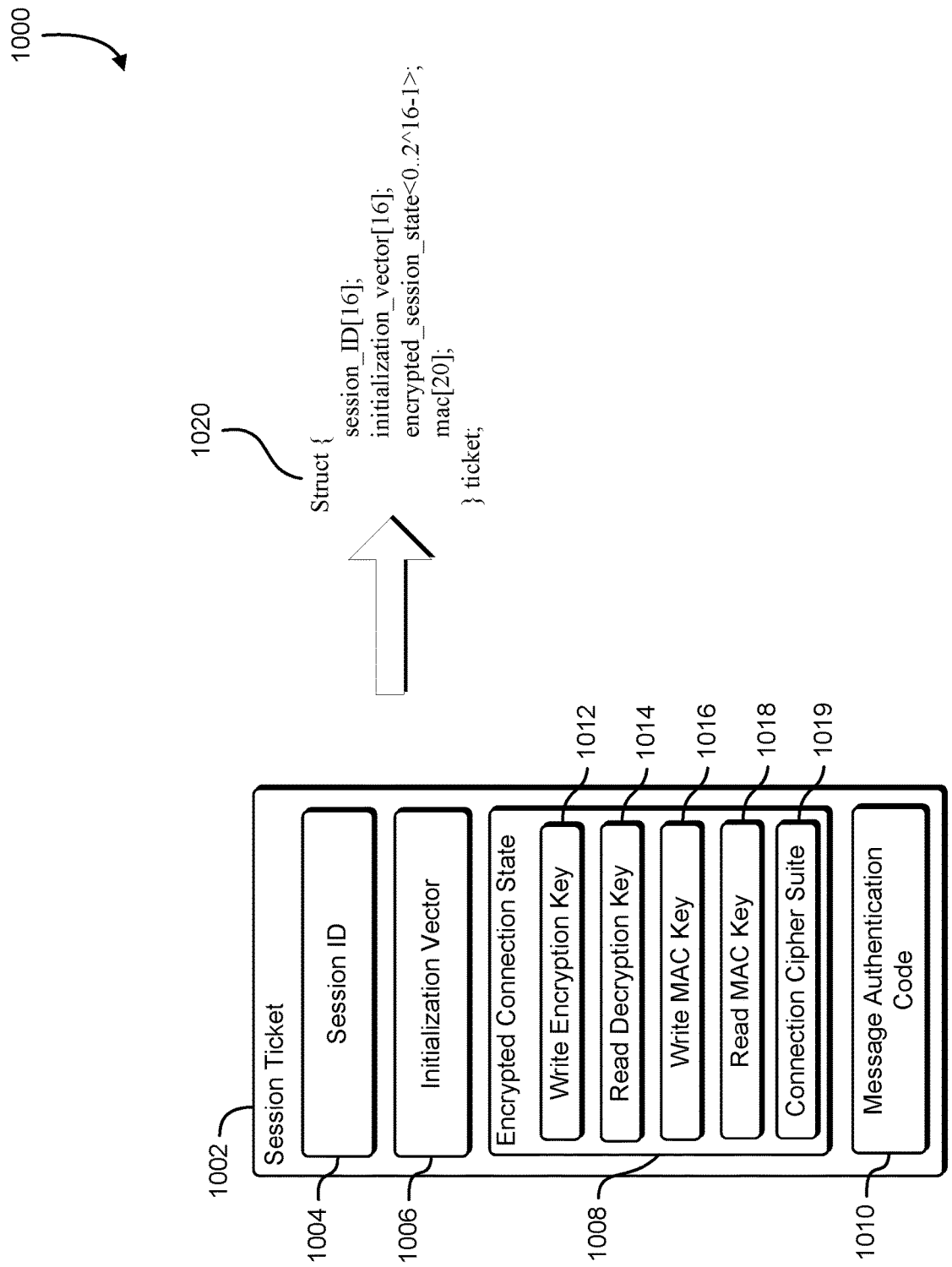
FIG. 10 shows an illustrative example of a TLS session ticket that supports TLS session resumption across multiple servers.

FIG. 10 shows an illustrative example of a TLS session ticket that supports TLS session resumption across multiple servers. A data diagram 1000 shows the structure of a session ticket 1002. The session ticket includes session ID 1004, and initialization vector 1006, an encrypted connection state 1008, and a message authentication code 1010. The session ID 1004 identifies the TLS session associated with the session ticket 1002. The session ID can be an integer, alphanumeric sequence, global unique identifier ("GUID"), or other comparable value. The initialization vector 1006 is a randomly generated value used during the encryption of the encrypted connection state 1008. The message authentication code 1010 helps maintain the integrity of the session ticket by guarding against unauthorized alteration or corruption.

The encrypted connection state 1008 includes a write encryption key 1012, a read decryption key 1014, a write MAC key 1016, a read MAC key 1018, and a connection cipher suite 1019. The encrypted connection state 1008 may include additional information associated with a TLS session such as a shared master secret, a premaster secret, or other cryptographic information. The session ticket 1002, when provided to a server computer system in a TLS "client hello" message, allows the server computer to recover the session information associated with a previous TLS session. A code fragment 1020 illustrates example code to define the session ticket 1002.

Figure 11:
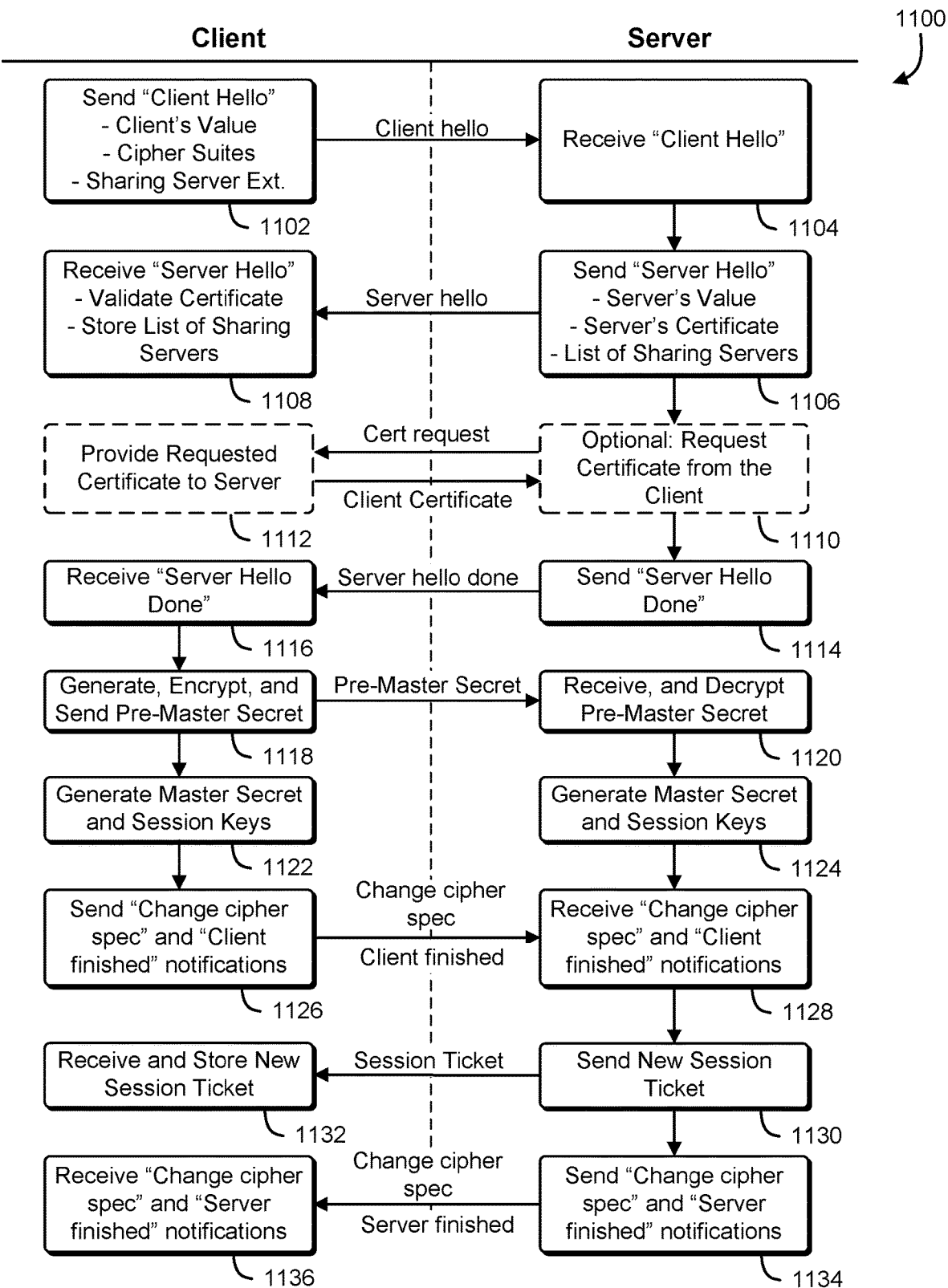
FIG. 11 shows an illustrative example of a process that, as a result of being performed by a client computer system and a server, establishes a new TLS session that supports TLS session resumption with more than one server.

FIG. 11 shows an illustrative example of a process that, as a result of being performed by a client computer system and a server, establishes a new TLS session that supports TLS session resumption with more than one server. A swim diagram 1100 illustrates the process which begins with the client computer system sending 1102 a TLS "client hello" message to the server. The TLS hello message can include various elements in accordance with the TLS standard version 1.2 or 1.3 such as a randomly generated value, and a list of cipher suites supported by the client computer system. The TLS hello message includes an extension record. The extension record is of a type that indicates support for TLS session resumption across multiple servers. By providing the TLS "client hello" message with the extension record, the client computer system indicates, to the server, that the client computer system supports TLS session resumption across multiple servers. An example of a possible extension record is shown in FIG. 9.

The server receives 1104 the "client hello" message from the client computer system and responds with a TLS "server hello" message. As a result of receiving the "client hello" message from the client computer system, the server examines the extensions, if any, included with the "client hello" message. The server sends 1106 a TLS "server hello" message to the client computer system. The TLS "server hello" message may include a randomly generated value, the digital certificate associated with the server, and other elements in accordance with the TLS standard. If the TLS "client hello" message included an extension record that indicates that the client computer system supports TLS session resumption across multiple servers, the server includes a corresponding extension record in the TLS "server hello". The corresponding extension record includes a list of servers with which the server shares TLS session resumption information. As a result, TLS session parameters established between the client computer system and the server may be reused when establishing a TLS session between the client computer system and other servers specified in the list of servers. At block 1108, the client computer system receives the TLS "server hello" message from the server. The client computer system confirms the identity of the server by validating the digital certificate provided by the server in the TLS "server hello" message. The extension record containing the list of servers is extracted from the extensions in the TLS "server hello" message. The list of servers is stored in a client database, along with cryptographic keys and session parameters for the TLS session currently being established between the client computer system and the server.

In some implementations, the server requests a client digital certificate from the client computer system. The client digital certificate may be used to confirm the identity of the client computer system. At block 1110, the server sends a request, to the client computer system, for the client certificate. The client computer system receives 1112 the request, and in response, provides the client digital certificate to the server. The server validates the client digital certificate by validating the digital signature using the client computer system's public cryptographic key.

After the exchange of hello messages, the client computer system and the server establish shared cryptographic secrets and cryptographic keys for the TLS session. At block 1114, the server sends a TLS "server hello done" message to the client computer system. The client computer system receives 1116 the TLS "server hello done". At block 1118, the client computer system generates a premaster secret for use in generating a master secret the premaster secret is encrypted by the client computer system using a public cryptographic key from the server's digital certificate. The encrypted premaster secret is transmitted to the server. At block 1120, the server receives the encrypted premaster secret. The encrypted premaster secret is decrypted using the private cryptographic key associated with the server's digital certificate. The client computer system generates a master secret and session keys from the premaster secret at block 1122, and the server generates a matching master secret and session keys from the premaster secret at block 1124.

After establishing master secrets and session keys, the client computer system and the server switch to a secure channel to complete the establishment of the TLS connection. At block 1126, the client computer system sends "change cipher spec" and "client finished" messages to the server. The "change cipher spec" message identifies the encryption algorithm used by the client computer system. The server receives 1128 the "change cipher spec" and "client finished" messages, and records the encryption algorithm used by the client computer system. The server collects the session information and generates 1130 a session ticket for the TLS session. The session ticket may include session keys, the master secret, and other cryptographic information or cipher parameters associated with the TLS session. The session ticket is encrypted by the server with a cryptographic key maintained by the server. In some examples, the session ticket is encrypted with the public cryptographic key associated with the server's digital certificate. In another example, the session ticket is encrypted with a symmetric cryptographic key maintained by the server, and the symmetric cryptographic key is stored on a shared database accessible to servers identified in the list of servers provided to the client computer system by the server. In yet another example, the session ticket is encrypted with a private key of a public-private cryptographic key pair, and the corresponding public key of the public-private cryptographic key pair is maintained on a shared database accessible to servers identified in the list of servers provided to the client computer system by the server. The encrypted session ticket is sent by the server to the client computer system. At block 1132, the client computer system receives the encrypted session ticket and stores the encrypted session ticket in the client database along with the list of servers with which the ticket may be used. The server sends 1134 "change cipher spec" and "server finished" messages to the client computer system, indicating to the client computer system that the server is switching to a secure channel. At block 1136, the client computer system receives the "change cipher spec" and "server finished" messages, and the TLS session negotiation is complete.

Figure 12:
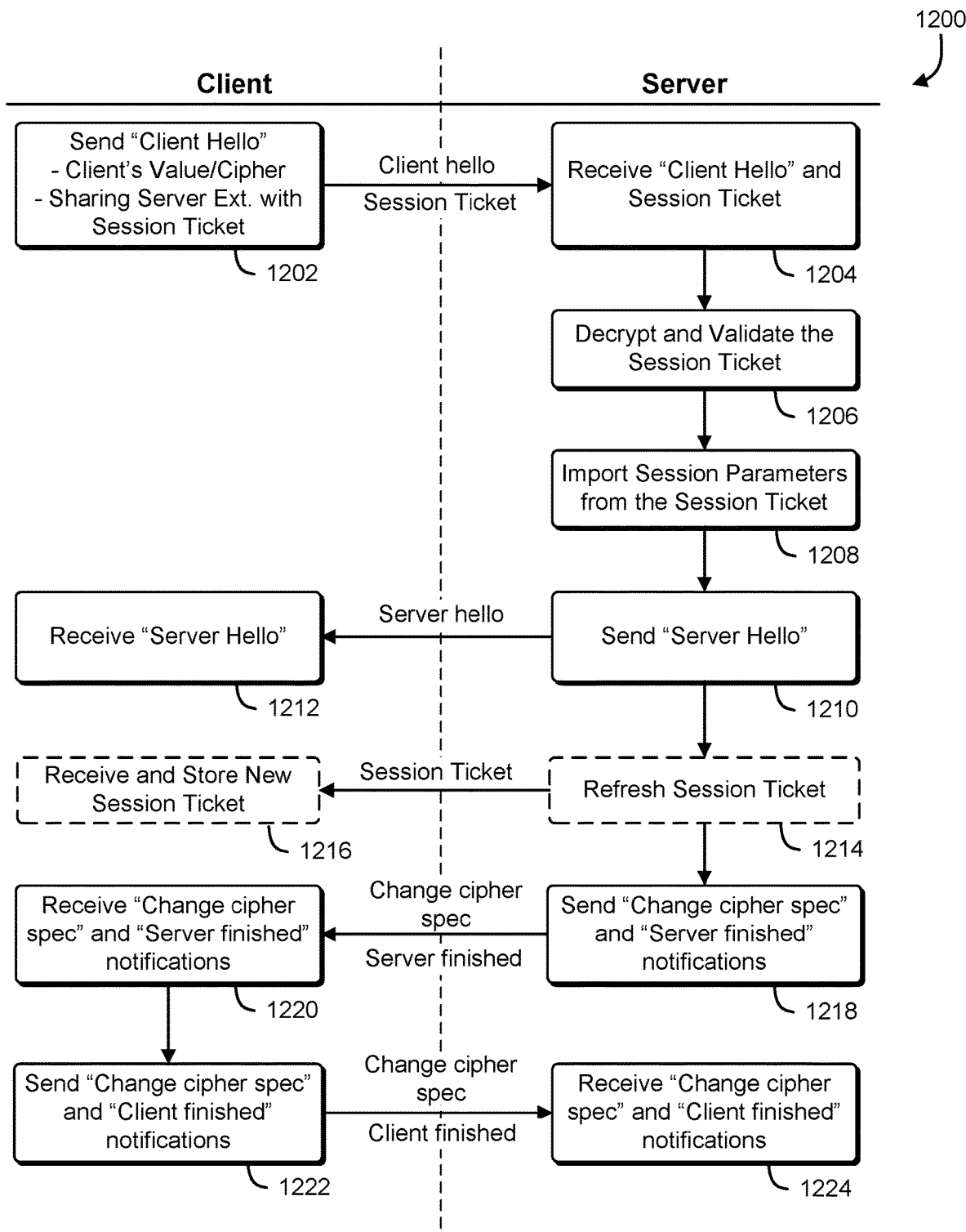
FIG. 12 shows an illustrative example of a process that, as a result of being performed by a client computer system and a server, resumes a previous TLS session with the server by providing a session ticket.

FIG. 12 shows an illustrative example of a process that, as a result of being performed by a client computer system and a server, resumes a previous TLS session with the server by providing a session ticket. A swim diagram 1200 illustrates a process that begins with a client computer system searching a client database and locating a session ticket applicable to the server. At block 1202, the client computer system generates a TLS "client hello" message that includes an extension record containing the session ticket. The client computer system transmits the TLS "client hello" message, including the session ticket, to the server. At block 1204, the server receives the TLS "client hello" message and the session ticket.

As a result of receiving the session ticket, the server attempts to resume a TLS session. At block 1206, the server accesses a shared database containing cryptographic keys for decrypting session tickets. If the server cannot locate a cryptographic key for decrypting the session ticket, the server negotiates a new TLS session with the client computer system. If the server can locate a cryptographic key for decrypting the session ticket, the server decrypts the session ticket and validates session information contained within the ticket. In one example, the session ticket has a format as shown in FIG. 10, and is validated using a message authentication code and an initialization vector included in the session ticket. At block 1208, the server imports the session keys from the session ticket. The server sends 1210 a TLS "server hello" message to the client computer system that indicates to the client computer system that the server has accepted the session ticket. At block 1212, the client computer system receives the TLS "server hello" message.

In some implementations, the server can provide the client computer system with the refresh session ticket. In such implementations, the server generates 1214 a refreshed session ticket containing fresh session keys and cryptographic information. The refreshed session ticket is encrypted and sent to the client computer system, and the server stores the cryptographic key used to encrypt the refreshed session ticket on the shared database. The client computer system receives 1216 the encrypted refreshed session ticket, and uses the encrypted refreshed session ticket to update the session ticket in client database.

The client computer system and the server initiate secure channels and complete the resumption of the TLS session in accordance with the TLS standard. At block 1218, the server sends a "change cipher spec" message and a "server finished" message to the client computer system. The client computer system receives 1220 the "change cipher spec" message and the "server finished" message from the server. At block 1222, the client sends a "change cipher spec" message and a "client finished" message to the server. The server receives 1224 the "change cipher spec" message and the "client finished" message from the client computer system.

Figure 13:
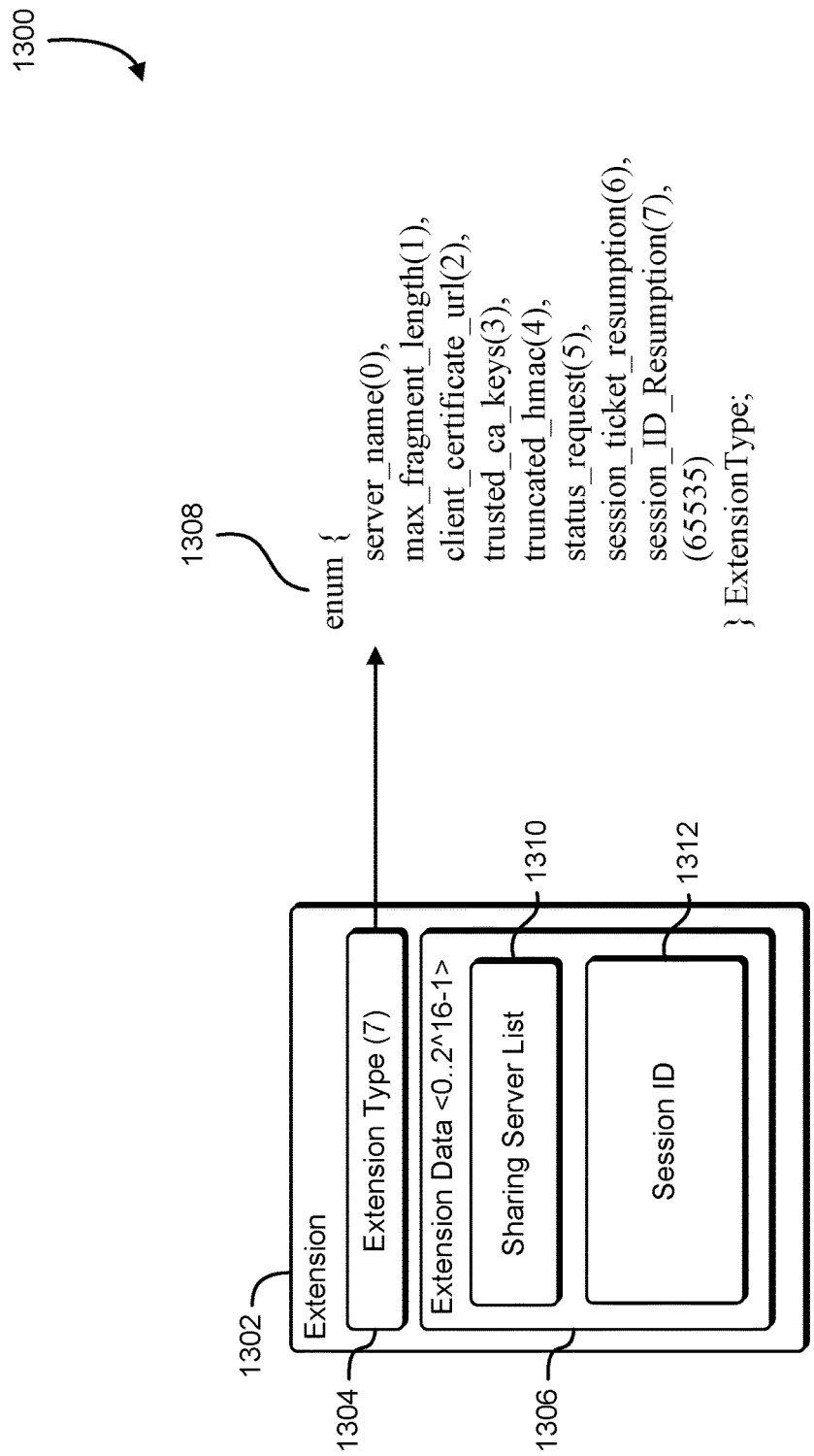
FIG. 13 shows an illustrative example of a TLS extension record that supports TLS session resumption across multiple servers using session IDs.

FIG. 13 shows an illustrative example of a TLS extension record that supports TLS session resumption across multiple servers using session IDs. A data diagram 1300 shows a structure of an extension record 1302. The extension record 1302 includes an extension type 1304, and extension data 1306. The extension type 1304 is defined by an enumeration 1308. The extension data 1306 includes a sharing server list 1310 and a session ID 1312. The sharing server list 1310 identifies a collection of servers for which particular TLS session data may be used for session resumption. When used within an extended TLS "server hello" message, the extension record 1302 allows a server to provide a client computer system with the list of servers for which the associated TLS session data may be used to perform session resumption.

Figure 14:
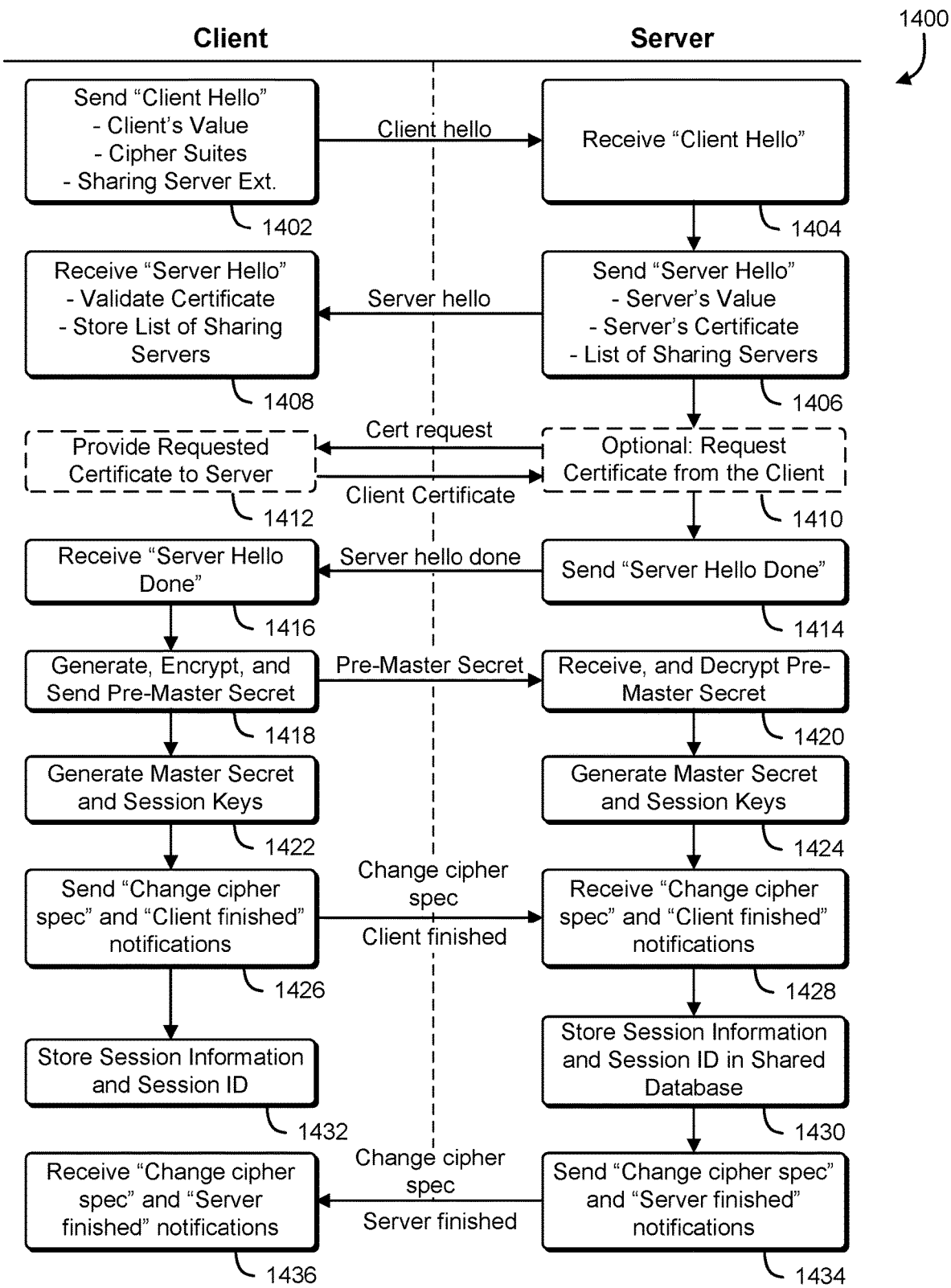
FIG. 14 shows an illustrative example of a process that, as a result of being performed by a client computer system and a server, establishes a new TLS session that supports TLS session resumption with more than one server using a shared session ID.

FIG. 14 shows an illustrative example of a process that, as a result of being performed by a client computer system and a server, establishes a new TLS session that supports TLS session resumption with more than one server using a shared session ID. A swim diagram 1400 illustrates the process which begins with the client computer system sending 1402 a TLS "client hello" message to the server. The TLS hello message can include various elements in accordance with the TLS standard version 1.2 or 1.3 such as a randomly generated value, and a list of cipher suites supported by the client computer system. The TLS hello message includes an extension record. The extension record is of a type that indicates support for TLS session resumption across multiple servers using a session ID. By providing the TLS "client hello" message with the extension record, the client computer system indicates, to the server, that the client computer system supports TLS session resumption across multiple servers using a session ID. An example of a possible extension record is shown in FIG. 13.

The server receives 1404 the "client hello" message from the client computer system and responds with a TLS "server hello" message. As a result of receiving the "client hello" message from the client computer system, the server examines the extensions, if any, included with the "client hello" message. In response, the server sends 1406 a TLS "server hello" message to the client computer system. The TLS "server hello" message may include a randomly generated value, a digital certificate associated with the server, and other elements in accordance with the TLS standard. If the TLS "client hello" message included an extension record that indicates that the client computer system supports TLS session resumption across multiple servers, the server includes a corresponding extension record in the TLS "server hello." The corresponding extension record includes a list of servers with which the server shares TLS session resumption information. As a result, TLS session parameters established between the client computer system and the server may be reused when establishing a TLS session between the client computer system and other servers specified in the list of servers. At block 1408, the client computer system receives the TLS "server hello" message from the server. The client computer system confirms the identity of the server by validating the digital certificate provided by the server in the TLS "server hello" message. The extension record containing the list of servers is extracted from the extensions in the TLS "server hello" message. The list of servers is stored in a client database, along with cryptographic keys and session parameters for the TLS session currently being established between the client computer system and the server. A session ID is negotiated between the client computer system and the server and can be exchanged using the "client hello" or "server hello" messages. The session ID is used to identify the parameters associated with the TLS session.

In some implementations, the server requests a client digital certificate from the client computer system. The client digital certificate may be used to confirm the identity of the client computer system. At block 1410, the server sends a request, to the client computer system, for the client certificate. The client computer system receives 1412 the request, and in response, provides the client digital certificate to the server. The server validates the client digital certificate by validating the digital signature using the client computer system's public cryptographic key.

After the exchange of hello messages, the client computer system and the server establish shared cryptographic secrets and cryptographic keys for the TLS session. At block 1414, the server sends a TLS "server hello done" message to the client computer system. The client computer system receives 1416 the TLS "server hello done." At block 1418, the client computer system generates a premaster secret for use in generating a master secret the premaster secret is encrypted by the client computer system using a public cryptographic key from the server's digital certificate. The encrypted premaster secret is transmitted to the server. At block 1420, the server receives the encrypted premaster secret. The encrypted premaster secret is decrypted using the private cryptographic key associated with the server's digital certificate. The client computer system generates a master secret and session keys from the premaster secret at block 1422, and the server generates a matching master secret and session keys from the premaster secret at block 1424.

After establishing master secrets and session keys, the client computer system and the server switch to a secure channel to complete the establishment of the TLS connection. At block 1426, the client computer system sends "change cipher spec" and "client finished" messages to the server. The "change cipher spec" message identifies the encryption algorithm used by the client computer system. The server receives 1428 the "change cipher spec" and "client finished" messages, and records the encryption algorithm used by the client computer system. The server collects the session information and stores 1430 the session information in a shared database. The stored session information may include session keys, the master secret, and other cryptographic information or cipher parameters associated with the TLS session. The session information is maintained on a shared database accessible to servers identified in the list of servers provided to the client computer system by the server, and is accessible using the session ID. At block 1432, the client computer system stores the session keys associated with the TLS session in a client database along with the list of servers with which the session keys may be used. The server sends 1434 "change cipher spec" and "server finished" messages to the client computer system, indicating to the client computer system that the server is switching to a secure channel. At block 1436, the client computer system receives the "change cipher spec" and "server finished" messages, and the TLS session negotiation is complete.

The information retained by the client computer system in the client database, and the information retained by the server in the shared database may be used by other server computers in the list of servers to resume the TLS session between the client computer system and the other server. The client computer system obtains applicable session parameters from the client database, and the other server obtains matching session parameters from the shared database. Both the client database and the shared database can index session parameters using the session ID.

Figure 15:
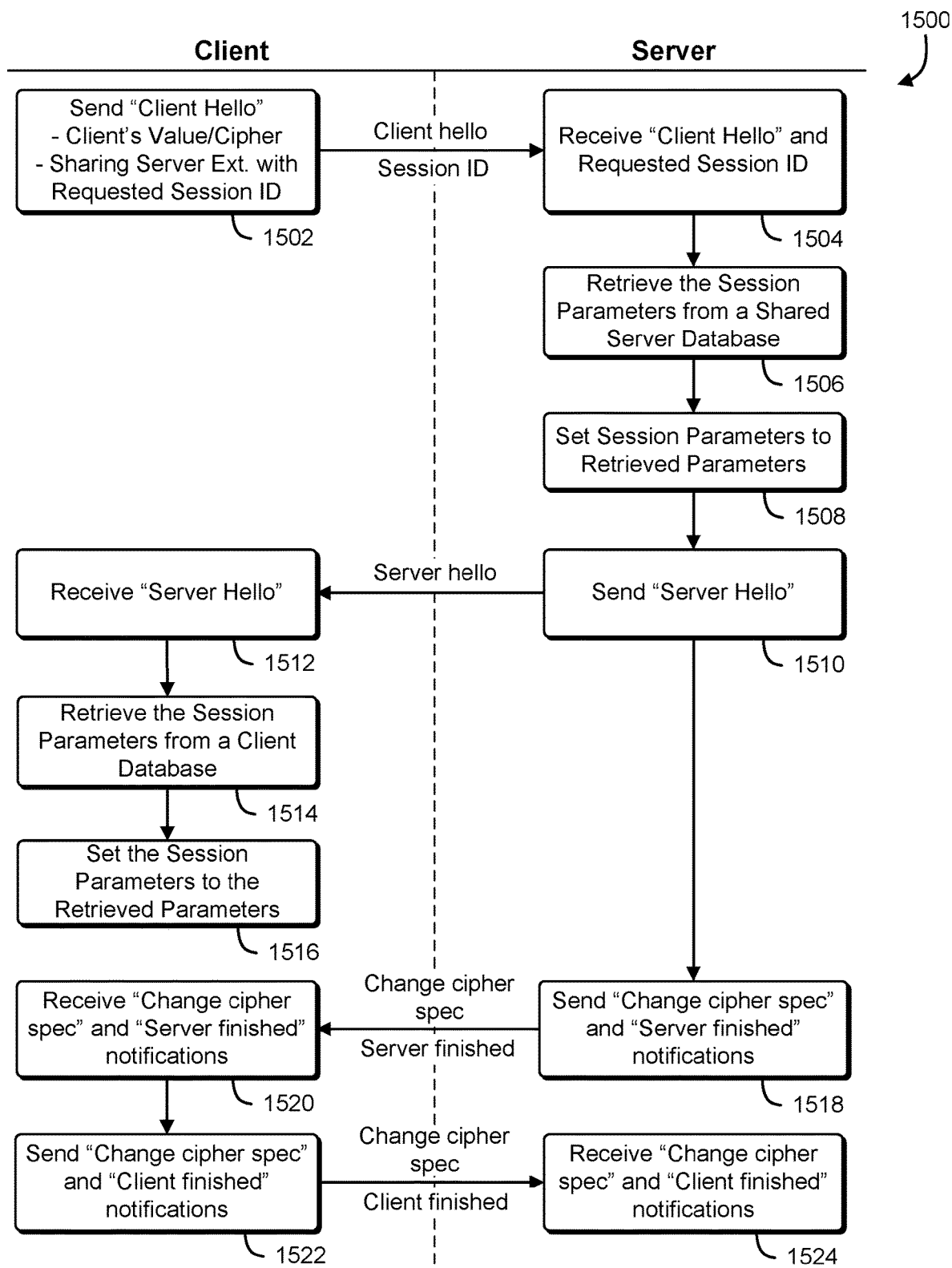
FIG. 15 shows an illustrative example of a process that, as a result of being performed by a client computer system and a server, resumes a previous TLS session with the server by providing a shared session ID.

FIG. 15 shows an illustrative example of a process that, as a result of being performed by a client computer system and a server, resumes a previous TLS session with the server by providing a shared session ID. A swim diagram 1500 illustrates a process that begins with a client computer system searching a client database and locating session resumption information that can be used to resume a TLS session with the server. If usable session resumption information is located, the client computer system retrieves the information along with a session ID for the information. At block 1502, the client computer system generates a TLS "client hello" message that includes an extension record containing the session ID. The client computer system transmits the TLS "client hello" message, including the session ID, to the server. At block 1504, The server receives the TLS "client hello" message and the session ID.

As a result of receiving the extended TLS "client hello" message that includes the session ID, the server attempts to resume the corresponding TLS session. At block 1506, the server accesses a shared database using the session ID and extracts relevant session keys and other TLS session parameters. If the server cannot locate information for resuming TLS session, the server negotiates a new TLS session with the client computer system. If the server can locate information for resuming TLS session, the server retrieves the identified information from the shared database. At block 1508, the server applies the identified information to the current TLS session by in part adopting the session keys extracted from the shared database. The server sends 1510 a TLS "server hello" message to the client computer system that indicates to the client computer system that the server has accepted the TLS session resumption request using the session ID.

At block 1512, the client computer system receives the TLS "server hello" message. Using the session ID, the client computer system retrieves 1514 the session parameters from a client database. At block 1516, the client computer system sets the session parameters based at least in part on the session parameters retrieved from the client database.

Once the session parameters are set by the client computer system and the server, the server sends 1518 a "change cipher spec" message and a "server finished" message to the client computer system. The client computer system receives 1520 the "change cipher spec" and "server finished" messages, and responds by sending 1522 a "change cipher spec" message and a "client finished" message to the server. At block 1524, the server receives the client's "change cipher spec" message and the "client finished" message. The client computer system and the server communicate with each other using the resumed TLS session which is configured using the stored session keys.

Figure 16:
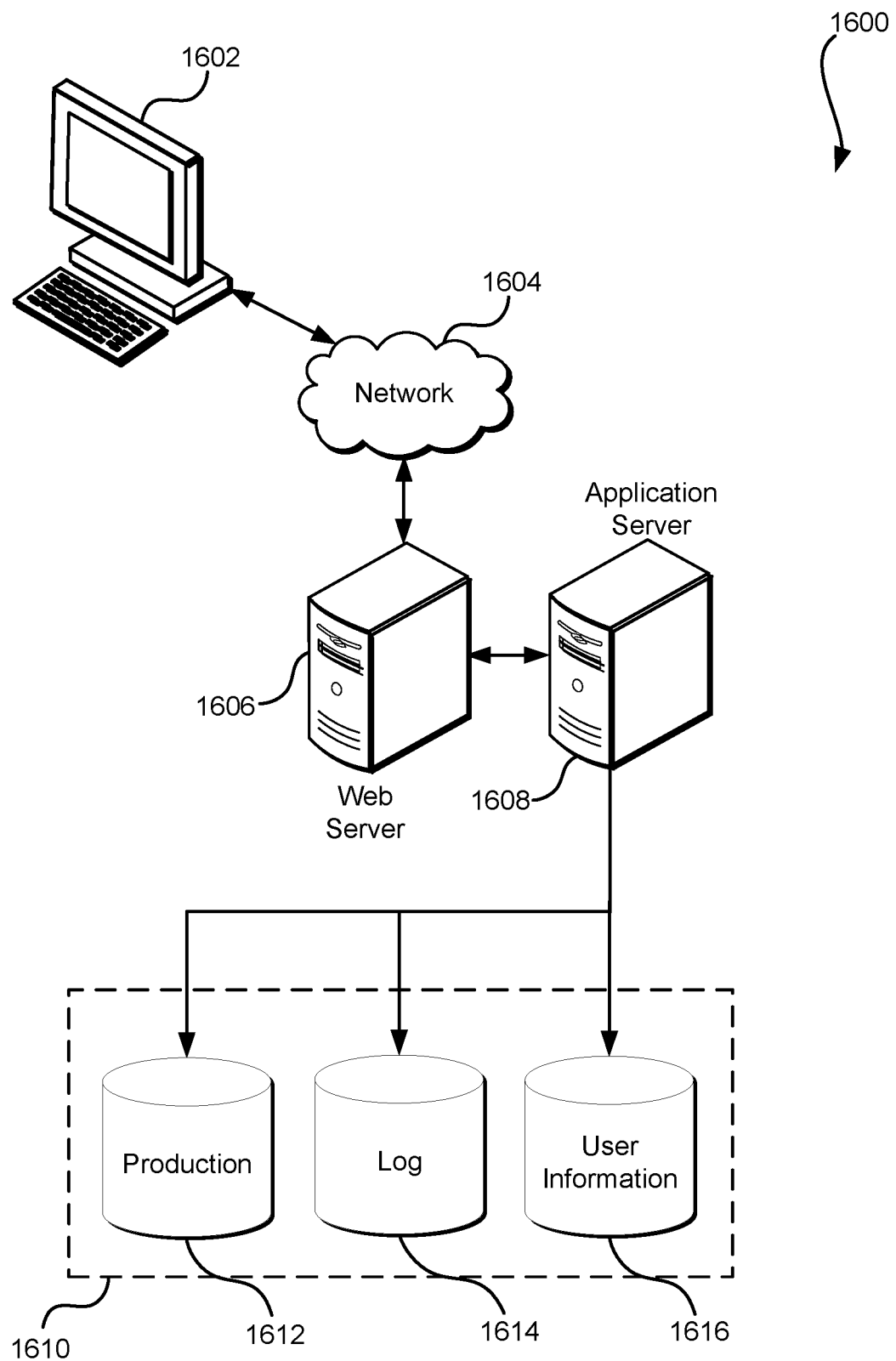
FIG. 16 illustrates an environment in which various embodiments can be implemented.

FIG. 16 illustrates aspects of an example environment 1600 for implementing aspects in accordance with various embodiments. As will be appreciated, although a web-based environment is used for purposes of explanation, different environments may be used, as appropriate, to implement various embodiments. The environment includes an electronic client device 1602, which can include any appropriate device operable to send and/or receive requests, messages, or information over an appropriate network 1604 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part on the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly addressable communications network, as the environment includes a web server 1606 for receiving requests and serving content in response thereto, although for other networks an alternative device serving a similar purpose could be used as would be apparent to one of ordinary skill in the art.

The illustrative environment includes at least one application server 1608 and a data store 1610. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually and/or through other senses. The handling of all requests and responses, as well as the delivery of content between the client device 1602 and the application server 1608, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 1610 can include several separate data tables, databases, data documents, dynamic data storage schemes and/or other data storage mechanisms and media for storing data relating to a particular aspect of the present disclosure. For example, the data store illustrated may include mechanisms for storing production data 1612 and user information 1616, which can be used to serve content for the production side. The data store also is shown to include a mechanism for storing log data 1614, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1610. The data store 1610 is operable, through logic associated therewith, to receive instructions from the application server 1608 and obtain, update or otherwise process data in response thereto. The application server 1608 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the client device 1602. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 16. Thus, the depiction of the system 1600 in FIG. 16 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGP") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

As discussed, numerous variations utilize symmetric and/or asymmetric cryptographic primitives. Symmetric key algorithms may include various schemes for performing cryptographic operations on data including block ciphers, stream ciphers and digital signature schemes. Example symmetric key algorithms include the advanced encryption standard (AES), the data encryption standard (DES), triple DES (3DES), Serpent, Twofish, blowfish, CASTS, RC4, and the international data encryption algorithm (IDEA). Symmetric key algorithms may also include those used to generate output of one way functions and include algorithms that utilize hash-based message authentication codes (HMACs), message authentication codes (MACs) in general, PBKDF2 and Bcrypt. Asymmetric key algorithms may also include various schemes for performing cryptographic operations on data. Example algorithms include those that utilize the Diffie-Hellman key exchange protocol, the digital signature standard (DSS), the digital signature algorithm, the ElGamal algorithm, various elliptic curve algorithms, password-authenticated key agreement techniques, the pallier cryptosystem, the RSA encryption algorithm (PKCS #1), the Cramer-Shoup cryptosystem, the YAK authenticated key agreement protocol, the NTRUEncrypt cryptosystem, the McEliece cryptosystem, and others. Elliptic curve algorithms include the elliptic curve Diffie—Hellman (ECDH) key agreement scheme, the Elliptic Curve Integrated Encryption Scheme (ECIES), the Elliptic Curve Digital Signature Algorithm (ECDSA), the ECMQV key agreement scheme, and the ECQV implicit certificate scheme. Other algorithms and combinations of algorithms are also considered as being within the scope of the present disclosure and the above is not intended to be an exhaustive list.

Note that the term "digital signature" includes any information usable to cryptographically verify authenticity of a message including information generated using an RSA-based digital scheme (such as RSA-PSS), the digital signature algorithm (DSA) and the elliptic curve digital signature algorithm, the ElGamal signature scheme, the Schnorr signature scheme, the Pointcheval-Stern signature algorithm, the Rabin signature algorithm, pairing-based digital signature schemes (such as the Boneh-Lynn-Schacham signature scheme), undeniable digital signature schemes, and others. Further, message authentication codes (such as hash-based message authentication codes (HMACs), keyed cryptographic hash functions, and other types of information may also be used as digital signatures.

In various embodiments, data objects such as digital signatures may be cryptographically verifiable. In one example, cryptographically verifiable data objects are created to be cryptographically verifiable by the system to which the data object is to be provided or another system that operates in conjunction with the system to which the data object is to be provided. For example, the data object may be encrypted so as to be decryptable by the system that will cryptographically verify the data object, where the ability to decrypt the data object serves as cryptographic verification of the data object. As another example, the data object may be digitally signed (thereby producing a digital signature of the data object) such that the digital signature is verifiable by the system that will cryptographically verify the data object. In other examples, both encryption and digital signatures are used for cryptographic verifiability and/or security. The key used to encrypt and/or digitally sign the data object may vary in accordance with various embodiments and the same key is not necessarily used for both encryption and digital signing, where applicable. In some embodiments, a key used to encrypt the data object is a public key of a public/private key pair where the private key of the key pair is maintained securely by the system to which the data object is to be provided, thereby enabling the system to decrypt the data object using the private key of the key pair. Using the public key to encrypt the data object may include generating a symmetric key, using the symmetric key to encrypt the data object, and encrypting the symmetric key using the public key, where the encrypted symmetric key is provided to a system with the encrypted data object to enable the system to use the corresponding private key to decrypt the symmetric key and use the decrypted symmetric key to decrypt the data object. Further, in some embodiments, the data object is digitally signed using a private key of a public/private key pair corresponding to the computer system that encrypts and/or digitally signs the data object (e.g., a user device). For example, an application may be provisioned with the private key and the data object may include a certificate for the private key for use by a system for verification of the digital signature of the data object. Other variations, including variations where a symmetric key shared between the user computer and the system that cryptographically verifies the data object can be used to encrypt and/or digitally sign the data object.

Note also that the examples used herein may be performed in compliance with one or more of: Request for Comments (RFC) 4250, RFC 4251, RFC 4252, RFC 4253, RFC 4254, RFC 4255, RFC 4256, RFC 4335, RFC 4344, RFC 4345, RFC 4419, RFC 4432, RFC 4462, RFC 4507, RFC 4716, RFC 4819, RFC 5647, RFC 5656, RFC 6187, RFC 6239, RFC 6594, and RFC 6668, which are incorporated by reference.

Generally, embodiments of the present disclosure may use various protocols, such as a SSL or TLS protocol and extensions thereto, such as defined in Request for Comments RFC 2246, RFC 2595, RFC 2712, RFC 2817, RFC 2818, RFC 3207, RFC 3268, RFC 3546, RFC 3749, RFC 3943, RFC 4132, RFC 4162, RFC 4217, RFC 4279, RFC 4347, RFC 4366, RFC 4492, RFC 4680, RFC 4681, RFC 4785, RFC 5054, RFC 5077, RFC 5081, RFC 5238, RFC 5246, RFC 5288, RFC 5289, RFC 5746, RFC 5764, RFC 5878, RFC 5932, RFC 6066, RFC 6083, RFC 6091, RFC 6176, RFC 6209, RFC 6347, RFC 6367, RFC 6460, RFC 6655, RFC 7027, and RFC 7366, which are incorporated herein by reference, to establish encrypted communications sessions. Other protocols implemented below the application layer of the Open Systems Interconnect (OSI) model may also be used and/or adapted to utilize techniques described herein. It should be noted that the techniques described herein are adaptable to other protocols such as the Real Time Messaging Protocol (RTMP), the Point-to-Point Tunneling Protocol (PPTP), the Layer 2 Tunneling Protocol, various virtual private network (VPN) protocols, Internet Protocol Security (e.g., as defined in RFC 1825 through 1829, RFC 2401, RFC 2412, RFC 4301, RFC 4303, and RFC 4309) and other protocols, such as protocols for secure communication that include a handshake.

Note that a system is said to be configured to trust a public cryptographic key if logic with which the system is configured to operate is dependent on whether an attempt to verify a digital signature with the public cryptographic key is successful. Similarly, a system is said to be configured to trust a symmetric cryptographic key if logic with which the system is configured to operate is dependent on whether an attempt to verify a digital signature with the symmetric cryptographic key is successful.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors.

The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A non-transitory computer-readable storage medium having stored thereon executable instructions that, when executed by one or more processors, cause the one or more processors to at least:
   as a result of a cryptographically protected communication session being initiated between a first server and a client computer, obtain at the client computer from the first server a list of servers that indicates a plurality of servers with which a cryptographically protected communication session may be established, wherein the list of servers is associated with session parameters that comprise at least a cryptographic key or a cipher suite;
   determine that a second server is in the list of servers;
   as a result of information that identifies a session associated with the session parameters, retrieve, from a database, the session parameters; and
   resume a cryptographically protected communication session between the second server and the client computer based at least in part on the session parameters such that data is securely communicated using at least the cryptographic key or the cipher suite of the session parameters.

2. The non-transitory computer-readable storage medium of claim 1, wherein the instructions further comprise instructions that, as a result of being executed by the one or more processors, cause the one or more processors to:
   determine a session identifier associated with the cryptographically protected communication session;
   store the session identifier in association with the session parameters; and
   obtain, by the second server, the session identifier, wherein the information includes the session identifier.

3. The non-transitory computer-readable storage medium of claim 1, wherein the instructions further comprise instructions that, as a result of being executed by the one or more processors, cause the one or more processors to:
   obtain a session ticket including the session parameters; and
   store the session ticket in association with the list of servers.

4. The non-transitory computer-readable storage medium of claim 3, wherein the instructions further comprise instructions that, as a result of being executed by the one or more processors, cause the one or more processors to:
   subsequent to the cryptographically protected communication session being resumed, establish new session parameters for the cryptographically protected communication session; and
   obtain a refreshed session ticket, the refreshed session ticket based at least in part on the new session parameters.

5. A system that at least:
   as a result of receiving, at a first server, from a client computer, a request to establish a cryptographically protecte communication session with the first server in accordance with a first set of session parameters, obtains a list of servers at the client computer from the first server that identifies a plurality of servers with which the cryptographically protected communication session may be resumed, wherein the first set of session parameters includes a cryptographic key and is associated with the list of servers;
   receives, at a second server in the list of servers, from the client computer, another request to establish another communication session with the second server; and
   based at least on the other request, establishes the other communication session between the second server and the client computer in accordance with a second set of session parameters, the second set of session parameters based at least in part on the first set of session parameters, wherein the other communication session enables data to be communicated between the second server and the client computer using at least the cryptographic key of the first set of session parameters.

6. The system of claim 5, wherein the system further:
   sends, from the second server, to the client computer, a session ticket including information that identifies the other communication session.

7. The system of claim 6, wherein:
   the session ticket is associated with a Transport Layer Security protocol (TLS) message; and
   the session ticket is provided at least based on a TLS handshake between the client computer and the second server.

8. The system of claim 6, wherein:
   the session ticket is encrypted.

9. The system of claim 5, wherein the system further:
   establishes an expiration time for the second set of session parameters;
   determines that the second set of session parameters is not expired based at least in part on the expiration time; and
   as a result of having determined that the second set of session parameters is not expired, causes the second set of session parameters to be available for establishing new communication sessions.

10. The system of claim 5, wherein the system further:
    establishes a usage limit for the second set of session parameters;
    determines a number of times that the second set of session parameters has been used to establish a communication session;
    determines that the number of times does not exceed the usage limit;
    as a result of having determined that the number of times does not exceed the usage limit, determines that the second set of session parameters is not expired; and
    as a result of having determined that the second set of session parameters is not expired, causes the second set of session parameters to be available for establishing new communication sessions.

11. The system of claim 6, wherein the information is associated with an extension record in an extended TLS message.

12. The system of claim 5, wherein the cryptographic key of the first set of session parameters includes a write encryption key, a read decryption key, a write message authentication code key, or a read message authentication code key.

13. A computer-implemented method comprising:
    as a result of receiving, from a client computer system, a request to establish a communication session and a handshake being initiated between the client computer system and a server providing to the client computer system, a list of servers that indicates a plurality of servers with which another communication session may be established;

receiving, from the client computer system, another request to establish another communication session;

storing a first set of session parameters associated with the communication session, wherein the first set of session parameters includes at least a cryptographic key or a cipher suite and is determined at least in part by the handshake between the client computer and the server;

obtaining the cryptographic key or the cipher suite from the stored first set of session parameters as a result of receiving the other request; and establishing a cryptographically protected communication session based on the other request, the cryptographically protected communication session allowing exchange of cryptographically protected data between the client computer and the server based at least in part on the cryptographic key or the cipher suite of the first set of session parameters.

14. The computer-implemented method of claim 13, wherein the request to establish the other communication session is received subsequent to receiving the request to establish the communication session.

15. The computer-implemented method of claim 13, further comprising:

receiving a session ticket, the session ticket including the first set of session parameters.

16. The computer-implemented method of claim 15, wherein:

the session ticket is encrypted using a symmetric key; and
the symmetric key is stored in a data store.

17. The computer-implemented method of claim 15, further comprising:

receiving another session ticket for the other communication session.

18. The computer-implemented method of claim 13, providing information that identifies is the server, the information associated with a digital certificate.

19. The computer-implemented method of claim 13, further comprising:

determining information that enables access to the first set of session parameters, the information associated with a message from the client computer.

20. The computer-implemented method of claim 13, wherein:

the first set of session parameters is removed from a data store a threshold amount of time after being stored in the data store.

21. The non-transitory computer-readable storage medium of claim 1, wherein the list of servers comprises a reference to information that identifies servers in a sharing zone.

* * * * *